United States Patent
Kato

(10) Patent No.: US 10,458,169 B2
(45) Date of Patent: Oct. 29, 2019

(54) DAMPER DEVICE

(71) Applicant: PIOLAX, INC., Yokohama-shi (JP)

(72) Inventor: Kouichi Kato, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 16/071,041

(22) PCT Filed: Jan. 12, 2017

(86) PCT No.: PCT/JP2017/000750
§ 371 (c)(1),
(2) Date: Jul. 18, 2018

(87) PCT Pub. No.: WO2017/126400
PCT Pub. Date: Jul. 27, 2017

(65) Prior Publication Data
US 2019/0032388 A1  Jan. 31, 2019

(30) Foreign Application Priority Data

Jan. 19, 2016 (JP) .................................. 2016-008277
Oct. 14, 2016 (JP) ...................... PCT/JP2016/080605

(51) Int. Cl.
*E05F 5/02* (2006.01)
*B60R 7/06* (2006.01)
(Continued)

(52) U.S. Cl.
CPC .................. *E05F 5/02* (2013.01); *B60R 7/06* (2013.01); *E05F 5/00* (2013.01); *F16F 7/00* (2013.01);
(Continued)

(58) Field of Classification Search
CPC ... Y10T 16/61; Y10T 16/628; Y10T 16/6285; Y10T 16/629; Y10T 16/54038;
(Continued)

(56) References Cited

U.S. PATENT DOCUMENTS 5,845,954 A * 12/1998 DePue ...................... B60R 7/06
 296/37.12
5,951,083 A *  9/1999 Bittinger .................. B60N 3/12
 16/339

(Continued)

FOREIGN PATENT DOCUMENTS

JP  UM H05-041976 A   6/1993
JP  UM H05-096359 A  12/1993
JP      H11-078702 A   3/1999

OTHER PUBLICATIONS

Translation of Written Opinion of the International Searching Authority (PCT Form PCT/ISA/237), in PCT/JP2017/000750.
(Continued)

*Primary Examiner* — William L Miller
(74) *Attorney, Agent, or Firm* — McGinn IP Law Group, PLLC

(57) ABSTRACT

A damper device provided between a fixed body having an opening portion and an openable and closable body mounted on the opening portion and configured to apply a braking force to the openable and closable body. An elastic resin member is mounted on a projecting portion provided on the openable and closable body. A receiving recess portion is provided on the fixed body to receive the elastic resin member. The elastic resin member has a base portion; a pair of arm portions; a bridge portion; and a stopper, which are formed integrally. The receiving recess portion has: an introducing portion configured to abut with the arm portions to bend them diametrically towards each other; and a restricting portion configured to abut with the stopper to
(Continued)

restrict the openable and closable body from opening, when the openable and closable body opens to cause the elastic resin member to move.

15 Claims, 22 Drawing Sheets

(51) Int. Cl.
  *E05F 5/00* (2017.01)
  *F16F 7/00* (2006.01)
  *F16F 7/08* (2006.01)
(52) U.S. Cl.
  CPC ......... *F16F 7/087* (2013.01); *Y10T 16/54038* (2015.01)
(58) Field of Classification Search
  CPC ..... E05F 5/02; E05F 5/00; E05F 5/022; E05F 5/025; B60R 7/06; F16F 7/00; F16F 7/087
  USPC .... 16/342, 82, 86 R, 86 A, 86 B; 296/24.34, 296/37.12; 267/136, 141; 224/483
  See application file for complete search history.

(56) References Cited

U.S. PATENT DOCUMENTS

| | | | |
|---|---|---|---|
| 6,076,878 A | 6/2000 | Isano | |
| 6,749,242 B2* | 6/2004 | Park | B60R 7/06 16/339 |
| 6,799,785 B1* | 10/2004 | Davis, Jr. | B60R 7/06 16/303 |
| 6,899,364 B2* | 5/2005 | Park | B60R 7/06 296/37.12 |
| 7,044,529 B2* | 5/2006 | Svenson | B60R 7/06 296/37.12 |
| 7,144,060 B2* | 12/2006 | Kim | B60R 7/06 296/37.12 |
| 7,823,960 B2* | 11/2010 | Sauer | B60R 7/06 296/187.05 |
| 10,131,283 B2* | 11/2018 | Roychoudhury | B60R 7/06 |
| 2004/0032068 A1* | 2/2004 | Shibao | F16F 7/09 267/196 |
| 2005/0275146 A1* | 12/2005 | Shin | B60R 7/06 267/226 |
| 2015/0176320 A1* | 6/2015 | Nakasone | F16F 1/128 16/85 |

OTHER PUBLICATIONS

International Search Report (ISR) (PCT Form PCT/ISA/210), in PCT/JP2017/000750 dated Feb. 14, 2017, with an English translation.
Written Opinion of the International Searching Authority (PCT Form PCT/ISA/237), in PCT/JP2017/000750, dated Feb. 14, 2017.

* cited by examiner

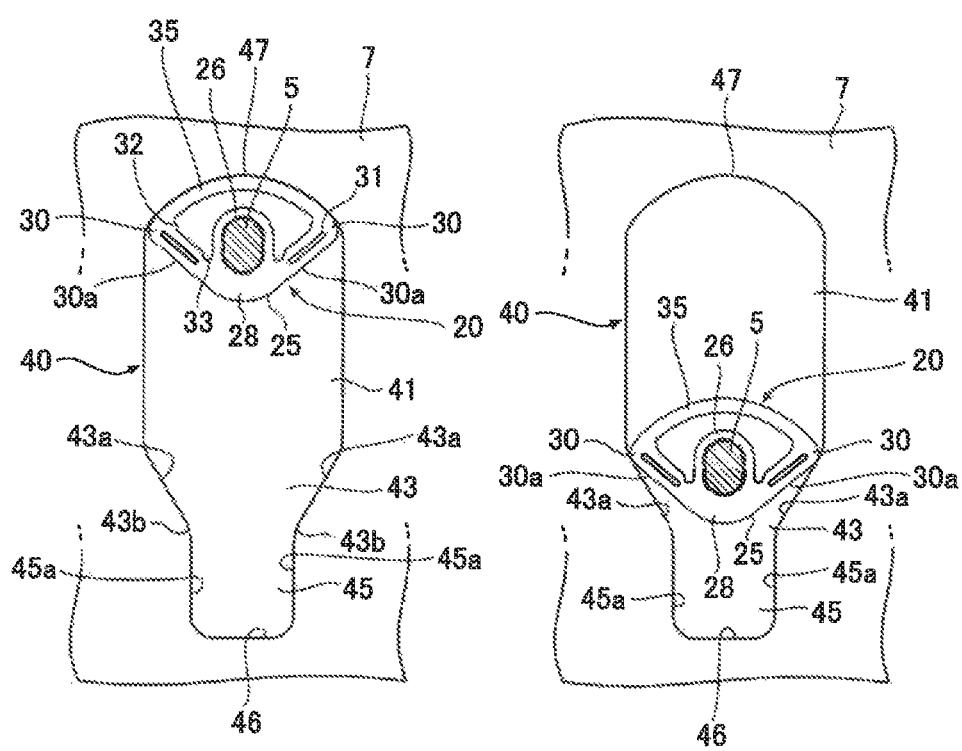

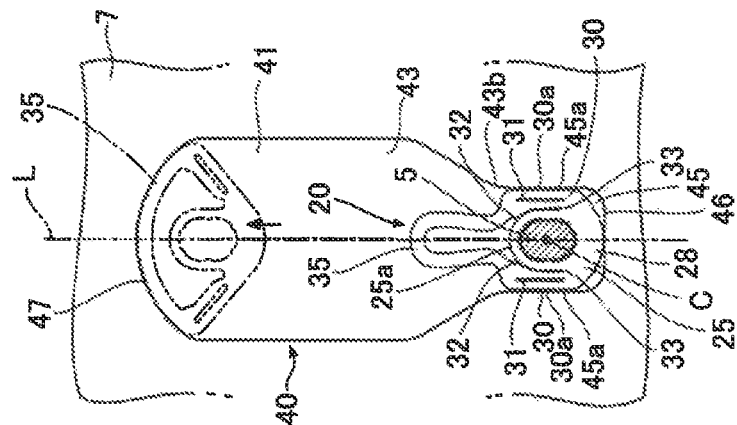
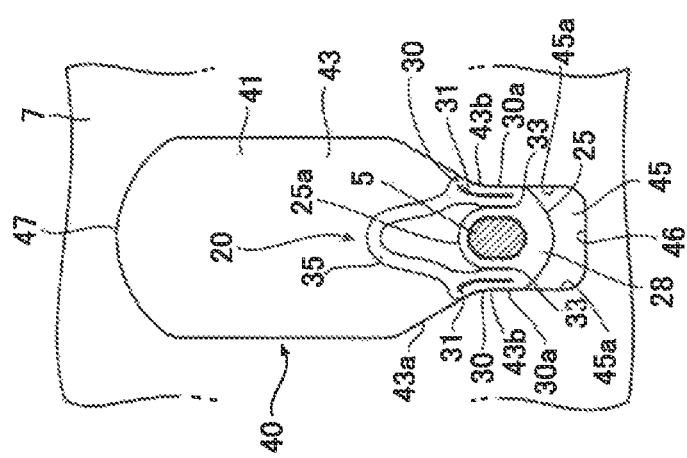
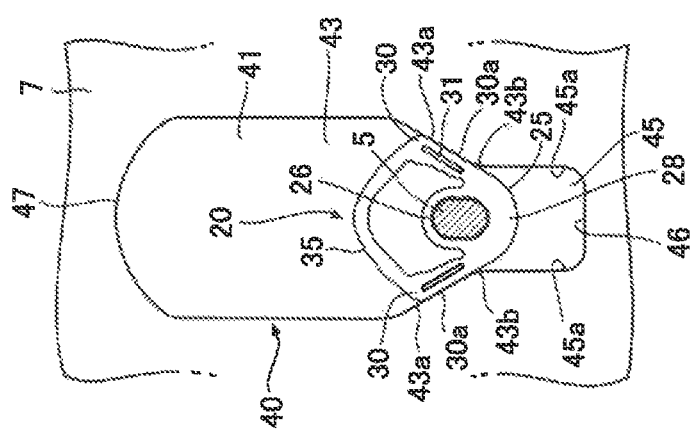

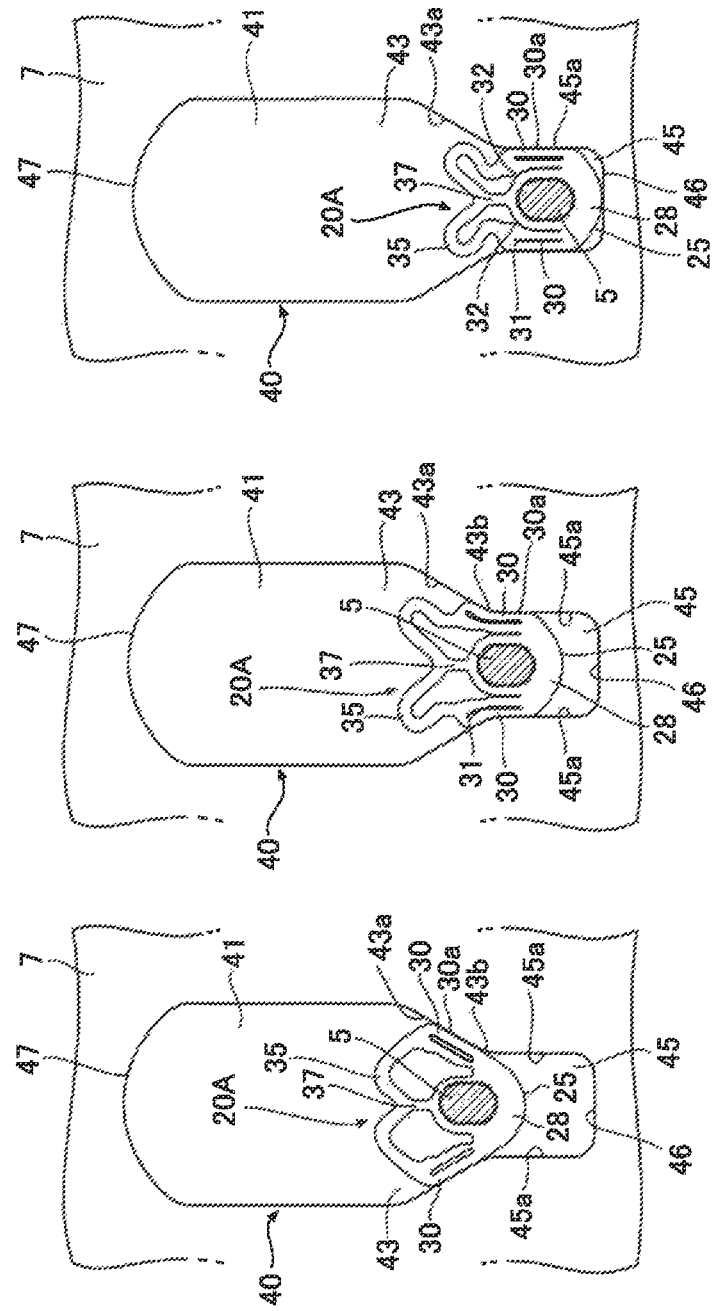

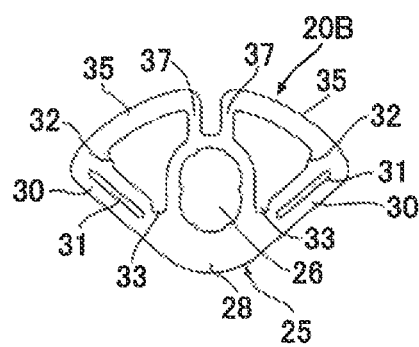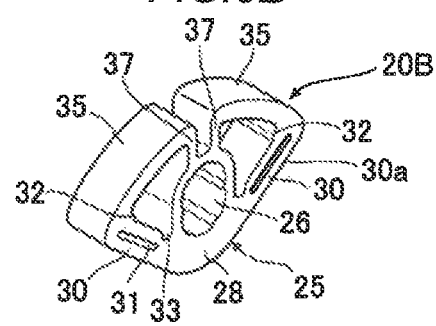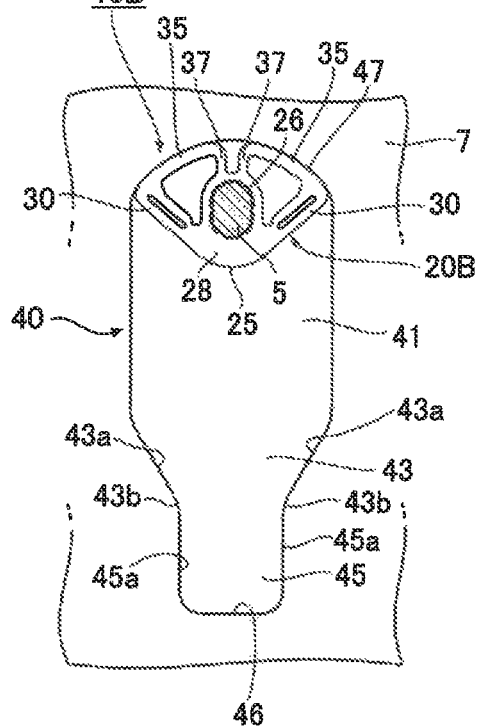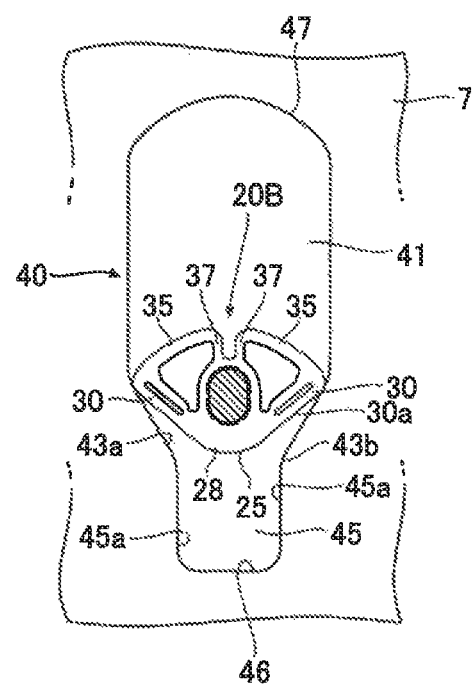

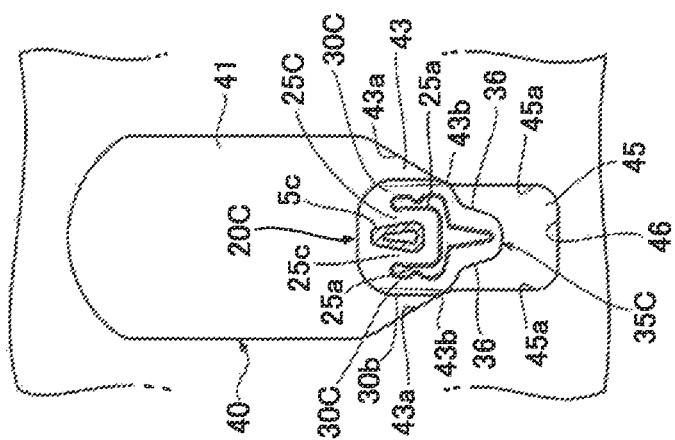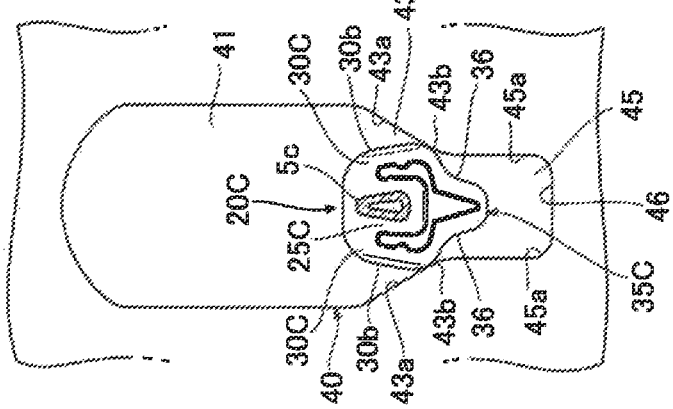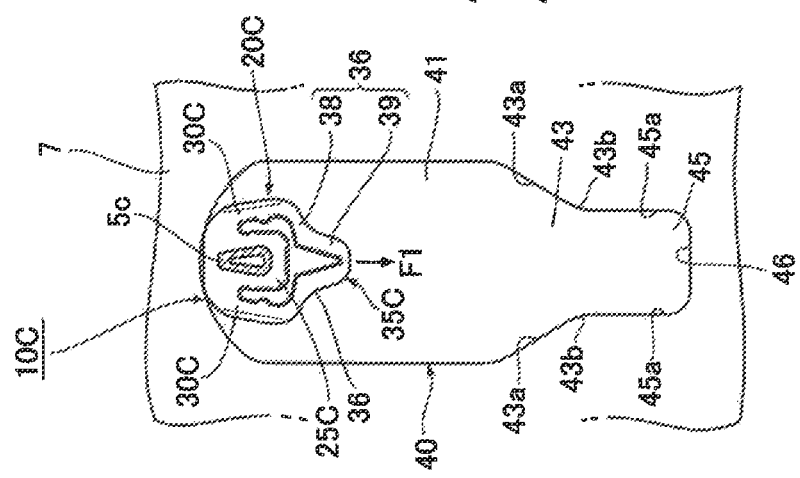

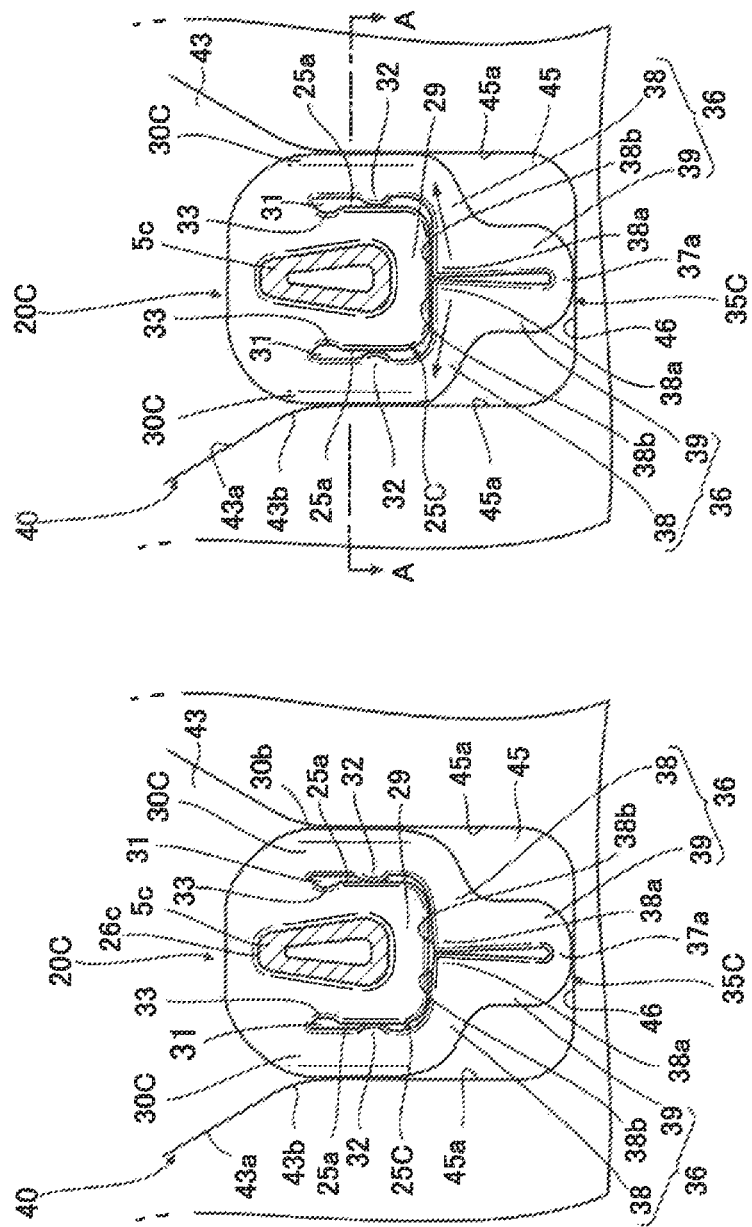

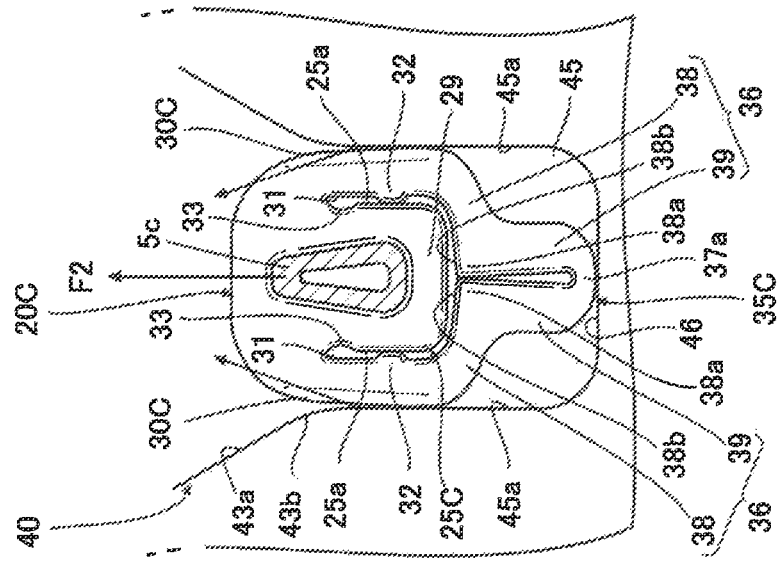
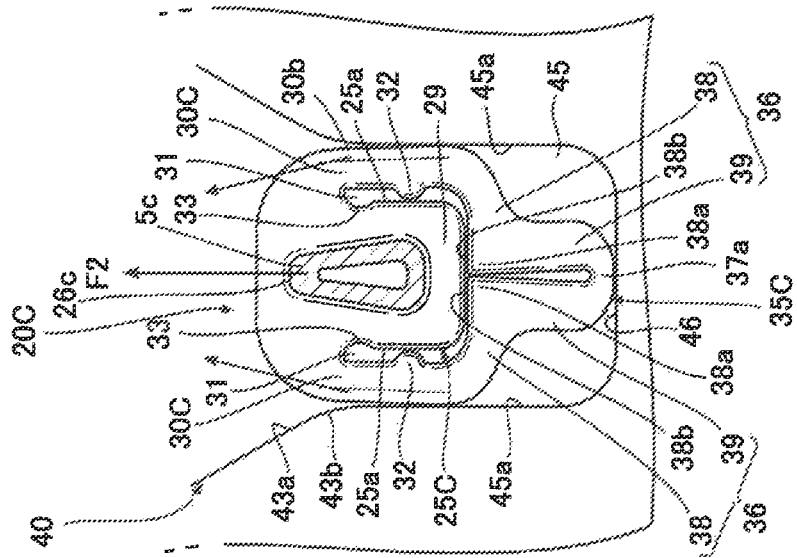

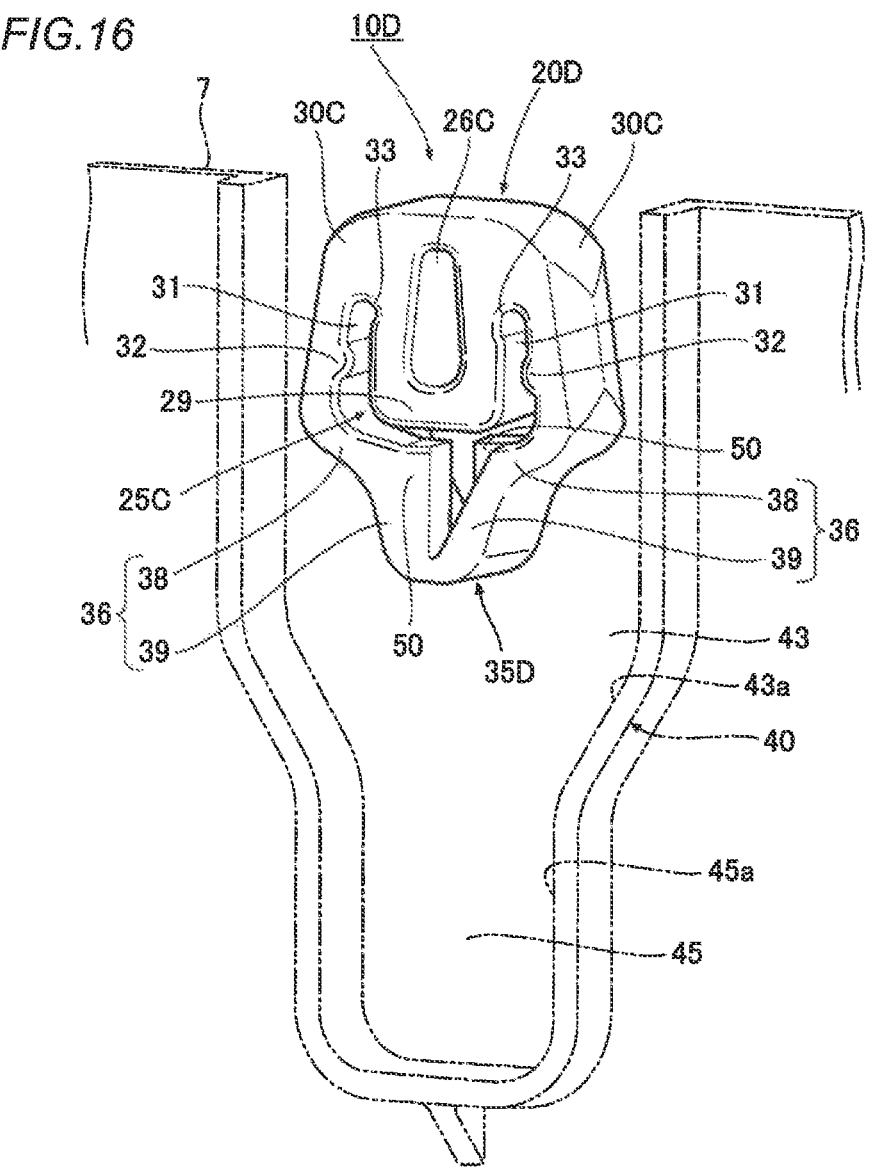

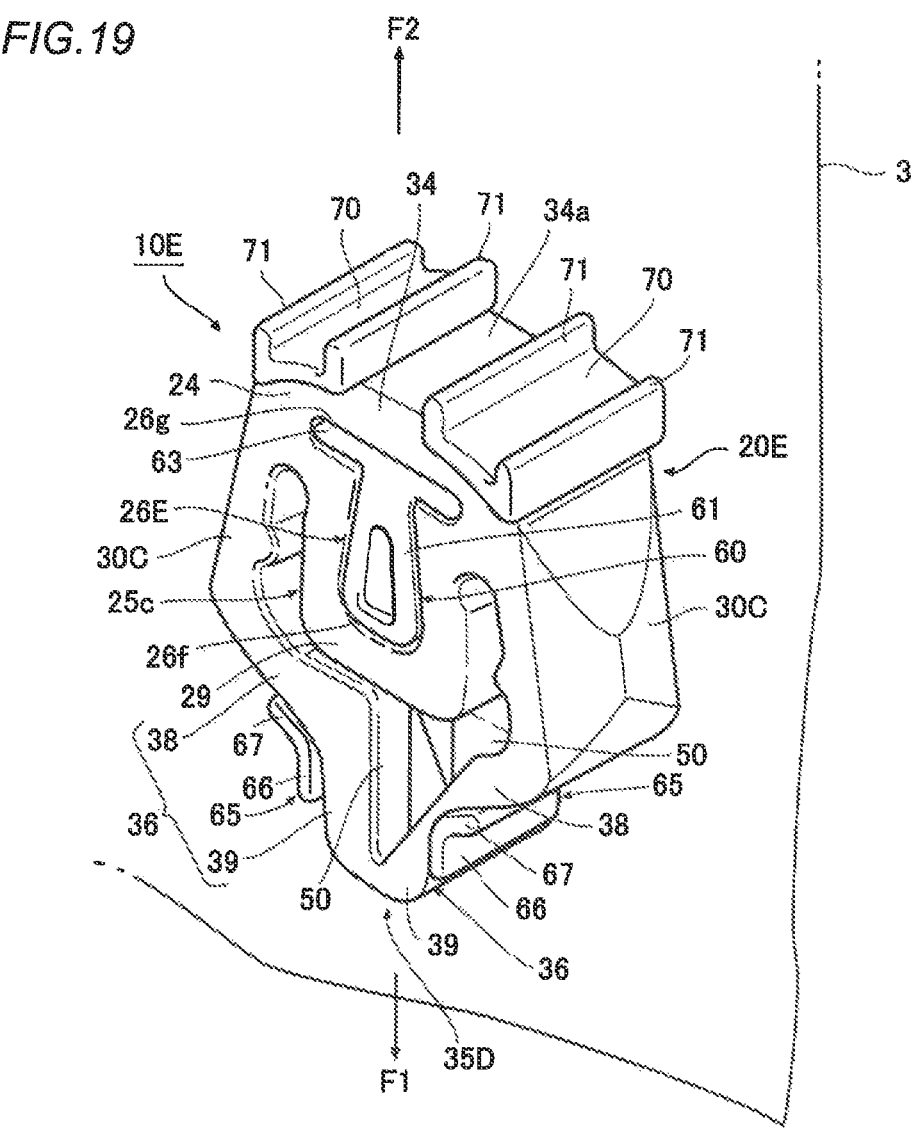

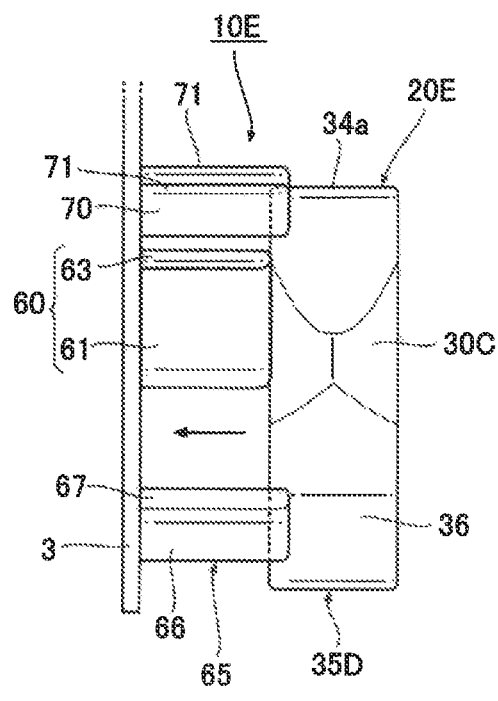 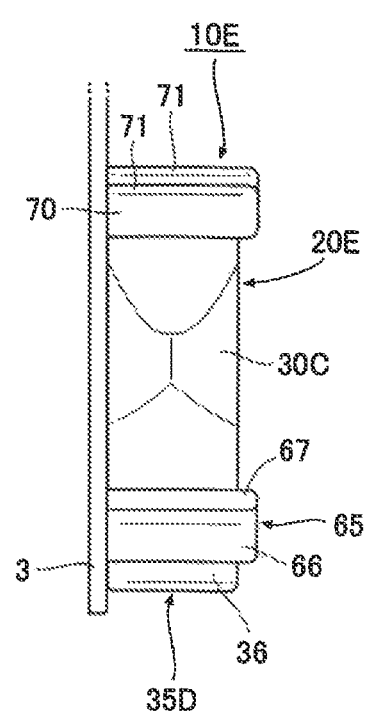

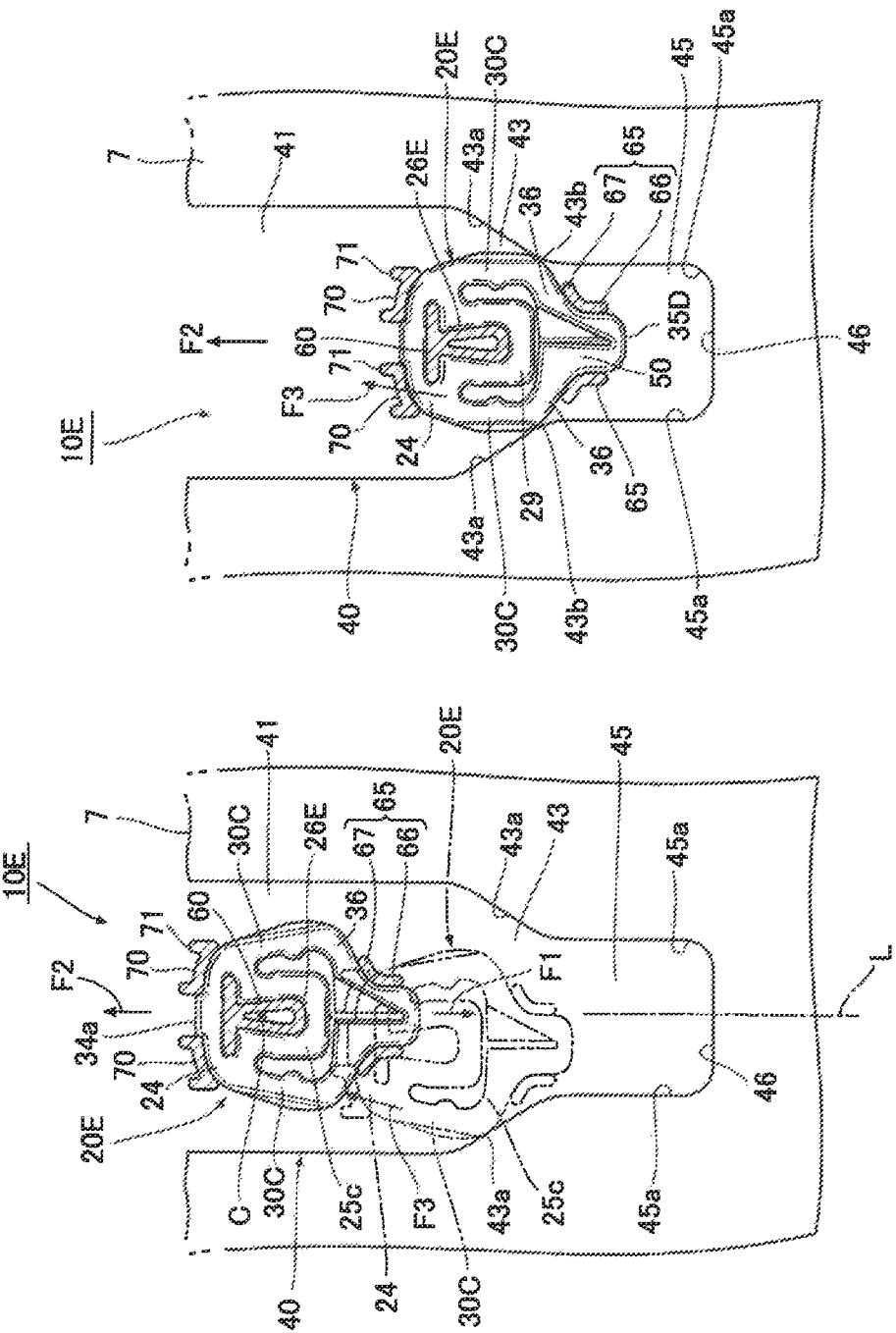

DAMPER DEVICE

TECHNICAL FIELD

The present invention relates to a damper device for applying a brake to an opening openable and closable body so that the openable and closable body is opened moderately from an opening portion of a fixed body.

BACKGROUND ART

For example, an openable and closable body such as a lid is mounted on an opening portion formed in a fixed body such as a glove box of a motor vehicle so as to be opened and closed. In the case of an opening and closing structure like the one described above, a damper device is sometimes provided to allow the openable and closable body to be opened and closed moderately by preventing the openable and closable member from being opened abruptly.

For example, an air damper and an oil damper, which are made up of a cylinder and a piston, are raised as a damper device of the type described above, however, these dampers have a complex structure. Due to this, damper devices having a relatively simple structure using neither a piston nor a cylinder have often been used.

For example, Patent Document 1 below discloses a damper device for an opening and closing mechanism including a main body and an openable and closable body for opening and closing the main body. This damper device is attached to one end of the openable and closable body to slow a motion made by the openable and closable body to open the main body and has a damper body having at least two leg rods extending from one end portion thereof where the damper device is attached to the openable and closable body into a fork-like shape and a biasing means for biasing both the leg rods of the damper body in a direction in which a space defined therebetween expands. A slit is provided in the main body to allow both the leg rods to pass therethrough while causing them to contract against the biasing by the spring.

PRIOR ART DOCUMENT

Patent Document

Patent Document 1: Japanese Utility Model Application Publication No. H05-096359

SUMMARY OF INVENTION

Problems to be Solved by Invention

However, the damper device of Patent Document 1 above needs two parts such as the damper body and the biasing means for biasing the two leg rods of the damper body, whereby the number of constituent parts of the damper device is increased. Due to this, the damper device has a drawback that its structure becomes so complex that producing the damper device becomes difficult.

To solve this problem, an object of the invention is to provide a damper device having such a small number of parts to simplify its structure.

Means for Solving Problems

To achieve the object, according to the invention, there is provided a damper device provided between a fixed body having an opening portion and an openable and closable body mounted on the opening portion of the fixed body so as to be opened and closed and configured to apply a braking force to the openable and closable body when the openable and closable body is opened and closed relative to the opening portion, the damper device having an elastic resin member mounted on a projecting portion provided on the openable and closable body and a receiving recess portion provided on the fixed body to receive the elastic resin member movably, wherein the elastic resin member has a base portion having a fitting portion in which the projecting portion fits, a pair of arm portions extending from an outer circumference of the base portion and capable of deforming elastically, a bridge portion coupling together distal end portions of the pair of arm portions directly or via the base portion and configured to deform elastically as the pair of arm portions deform elastically, and a stopper means configured to be brought into abutment with the receiving recess portion to restrict the openable and closable body from opening when the openable and closable body opens, wherein the base portion, the pair of arm portions, the bridge portion and the stopper means are formed integrally, and wherein the receiving recess portion has an introducing portion configured to come into abutment with the pair of arm portions to bend them diametrically towards each other and a restricting portion configured to come into abutment with the stopper means to restrict the openable and closable body from opening, the introducing portion and the restricting portion so functioning when the openable and closable body opens to cause the elastic resin member to move.

Advantageous Effects of Invention

According to the invention, the elastic resin member moves in the receiving recess portion as the openable and closable body opens from the opening portion of the fixed body, and when the pair of arm portions come into abutment with the introducing portion, not only are the pair of arm portions bent diametrically towards each other to be deformed elastically but also the bridge portion is elastically deformed, allowing the stopper portion to come into abutment with the restricting portion. Due to this configuration, the openable and closable body is allowed to open slowly from the opening portion of the fixed body while obtaining the damper effect. In addition, in this damper device, the elastic resin member has the base portion, the pair of arm portions, the bridge portion and the stopper means, and these constituent parts are formed integrally, whereby the structure of the damper device can be simplified.

BRIEF DESCRIPTION OF DRAWINGS

FIG. 2A is a front view of an elastic resin member, FIG. 2B is a perspective view of the elastic resin member, and FIG. 2C is a perspective view of a projecting portion.

FIGS. 3A and 3B show a state in which the damper device is in use, and FIG. 3A is an explanatory drawing of a state in which an openable and closable body is closed, and FIG. 3B is an explanatory drawing of a first state occurring when the openable and closable body is opened.

FIGS. 4A to 4C show a state in which the damper device is in use, and FIG. 4A is an explanatory drawing of a second state occurring when the openable and closable body is opened, FIG. 4B is an explanatory drawing of a third state occurring when the openable and closable body is opened, and FIG. 4C is an explanatory drawing of a state in which the openable and closable body is opened.

FIG. 6A is a front view of an elastic resin member, FIG. 6B is a perspective view of the elastic resin member, FIG. 6C is an explanatory drawing of a state in which an openable and closable body is closed, and FIG. 6D is an explanatory drawing showing a first state occurring when the openable and closable body is opened.

FIGS. 7A to 7C show the damper device of the second embodiment of the invention in use, and FIG. 7A is an explanatory drawing showing a second state occurring when the openable and closable body is opened, FIG. 7B is an explanatory drawing showing a third state occurring when the openable and closable body is opened, and FIG. 7C is an explanatory drawing of a state in which the openable and closable body is opened.

FIGS. 8A to 8D show a third embodiment of a damper device of the invention, FIG. 8A is a front view of an elastic resin member, FIG. 8B is a perspective view of the elastic resin member, FIG. 8C is an explanatory drawing of a state in which an openable and closable body is closed, and FIG. 8D is an explanatory drawing showing a first state occurring when the openable and closable body is opened.

FIG. 9A is an explanatory drawing showing a second state occurring when the openable and closable body is opened, FIG. 9B is an explanatory drawing showing a third state occurring when the openable and closable body is opened, and FIG. 9C is an explanatory drawing of a state in which the openable and closable body is opened.

FIG. 10A is a perspective view of an elastic resin member, and FIG. 10B is a front view of the elastic resin member.

FIGS. 12A to 12C show the damper device of the fourth embodiment of the invention in use, and FIG. 12A is an explanatory drawing showing a first state occurring when an openable and closable body is opened, FIG. 12B is an explanatory drawing showing a second state occurring when the openable and closable body is opened, and FIG. 12C is an explanatory drawing showing a third state occurring when the openable and closable body is opened.

FIGS. 13A and 13B show the damper device of the fourth embodiment of the invention in use, and FIG. 13A is an explanatory drawing showing a first state occurring when the openable and closable body is being opened, and FIG. 13B is a second state occurring when the openable and closable body is being opened (a state in which the openable and closable body is opened completely).

FIGS. 14A and 14B show the damper device of the fourth embodiment of the invention in use, and FIG. 14A is an explanatory drawing showing a first state occurring when the openable and closable body is attempted to be closed from a state in which the openable and closable body is closed, and FIG. 14B is an explanatory drawing showing a second state occurring then.

FIG. 16 is a perspective view showing a fifth embodiment of a damper device of the invention.

FIG. 19 is a perspective view of the damper device showing a state in which an elastic resin member is mounted on a projecting portion.

FIGS. 20A and 20B show a procedure of mounting the elastic resin member on the projecting portion, and FIG. 20A is an explanatory drawing showing a first step, and FIG. 20B is an explanatory drawing showing a second step.

FIGS. 21A and 21B show the damper device of the sixth embodiment of the invention in use, and FIG. 21A is an explanatory drawing of a state in which an openable and closable body is closed, and FIG. 21B is an explanatory drawing showing a first state occurring when the openable and closable body is opened.

FIG. 22A is an explanatory drawing showing a second state occurring when the openable and closable body is opened, and FIG. 22B is an explanatory drawing of a state in which the openable and closable body is opened.

EMBODIMENTS OF INVENTION

Figure 1:
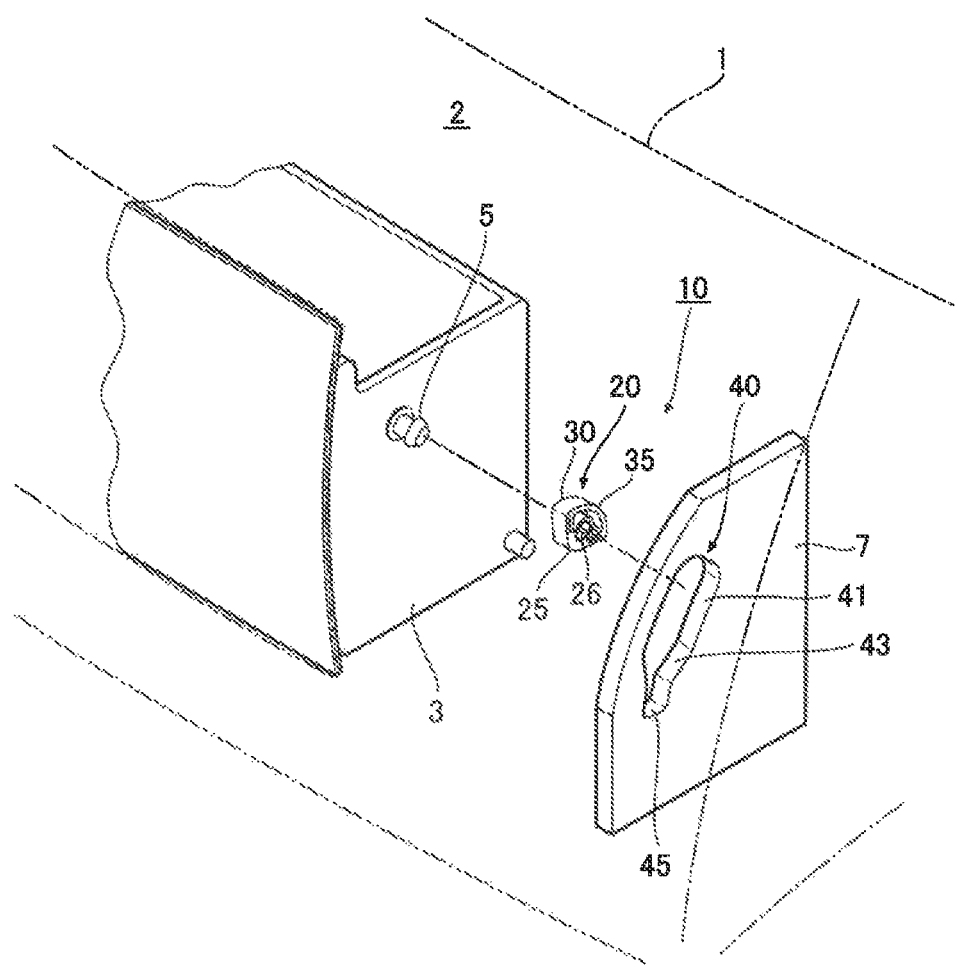
FIG. 1 is an exploded perspective view showing a first embodiment of a damper device of the invention.

Hereinafter, referring to the drawings, a first embodiment of a damper device of the invention will be described.

As shown in FIG. 1, a damper device 10 of this embodiment is provided, for example, between a fixed body 1 having an opening portion 2 such as a glove box or the like which is provided in an instrument panel of a vehicle and an openable and closable body 3 mounted on the opening portion 2 of the fixed body 1 so as to be opened and closed to apply a braking force to the openable and closable body 3 when the openable and closable body 3 is opened and closed relative to the opening portion 2.

This damper device 10 may be applied, for example, to a structure in which a box-shaped glove box is mounted rotatably in an opening portion of an instrument panel (in this case, the instrument panel constitutes a "fixed body" and the glove box constitutes an "openable and closable body") or a structure in which a lid is mounted on an opening portion in an instrument panel so as to be opened and closed (in this case, the instrument panel constitutes a "fixed body" and the lid constitutes an "openable and closable body") and can be used widely for various types of openable and closable bodies configured to open and close the opening portion of the fixed body.

Then, the damper device 10 has an elastic resin member 20 mounted on a projecting portion 5 provided on the openable and closable body 3 and a receiving recess portion 40 provided on the fixed body 1 to receive the elastic resin member 20 movably when the openable and closable body 3 is opened (refer to FIG. 1).

As shown in FIG. 1, the projecting portion 5 is provided on a side surface of the glove box, which is the openable and closable body 3, so as to project therefrom. Referring to FIG. 2C together, the projecting portion 5 of this embodiment has a shaft portion 5a, a disc-shaped flange portion 5b formed at a proximal end side of the shaft portion 5a and a tapered distal end portion 5c provided at a distal end side of the shaft portion 5a so as to project therefrom. Additionally, the shaft portion 5a has a rectangular shape which is rounded at longitudinal ends thereof.

Figure 2A:
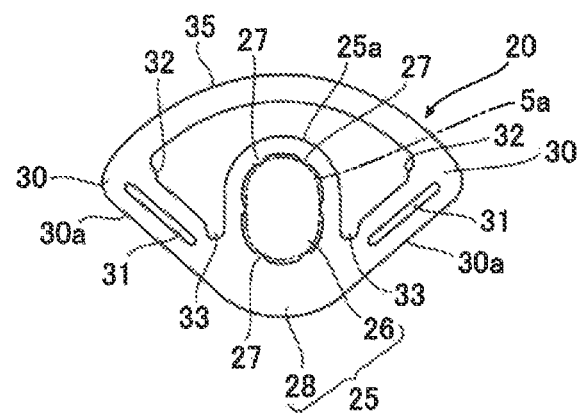
FIGS. 2A to 2C show constituent members of the damper device.
Figure 2B:
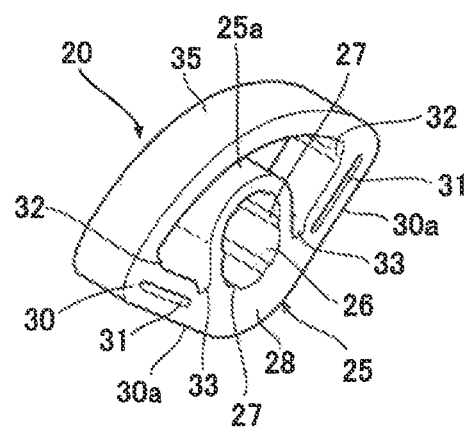
Figure 2C:
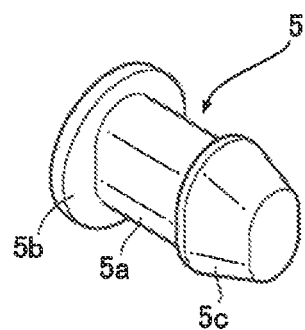

On the other hand, as shown in FIGS. 2A and 2B, the elastic resin member 20 has a base portion 25, a pair of arm portions 30, 30, a bridge portion 35, and a stopper means configured to come into abutment with the receiving recess portion 40 when the openable and closable body 3 opens to restrict the openable and closable body 3 from opening. In this embodiment, a stopper portion 28 constituting the stopper means is provided integrally on the base portion 25, and the base portion 25 has the stopper means.

The base portion 25 has a fitting portion 26 which fits on the projecting portion 5. As shown in FIG. 2A, the base portion 25 of this embodiment has a substantially oval shape which has a major axis and a minor axis and which is rounded at longitudinal ends thereof. The fitting portion 26 is provided at a longitudinal end side of the base portion 25 and is rounded at longitudinal ends thereof so as to have an elongated hole shape to match the shaft portion 5a of the projecting portion 5. The stopper portion 28 having a curved outer surface and a predetermined thickness is provided adjacent on the fitting portion 26 at the other longitudinal end side of the base portion 25. This stopper portion 28 constitutes a "stopper means" of the invention. The stopper portion 28 comes into abutment with a restricting portion 46, which will be described later, of the receiving recess portion 40 with a predetermined clearance defined relative to corner portions between the restricting portion 46 and contact surfaces 45a, 45a of a holding portion 45, which will also be described later, of the receiving recess portion 40 (refer to FIG. 4C).

The fitting portion 26 of this embodiment is rounded at the longitudinal ends so as to have the elongated hole shape to match the shaft portion 5a of the projecting portion 5, and a plurality of protuberant portions 27 are provided at even intervals in a circumferential direction on an inner circumference of the fitting portion 26 (refer to FIG. 2A).

Then, the shaft portion 5a of the projecting portion 5 is inserted into the fitting portion 26 of the base portion 25, and the flange portion 5b of the projecting portion 5 comes into abutment with a rear hole circumferential edge portion of the fitting portion 26, while the distal end portion 5c of the projecting portion 5 comes into engagement with a front hole circumferential edge portion of the fitting portion 26, whereby the elastic resin member 20 is mounted on the projecting portion 5.

The fitting portion does not necessarily have to have the hole shape and hence may be formed into a recess shape which does not penetrate the elastic resin member 20, and therefore if the fitting portion is fittable with the projecting portion of the openable and closable body side, the shape thereof is not particularly limited.

The pair of arm portions 30, 30, which can be deformed elastically, are provided on the base portion 25 so as to extend from an outer circumferential surface 25a thereof in a direction in which they move away from each other. In this embodiment, the pair of arm portions 30, 30 extend the same length from an outer circumferential surface of an end portion of the stopper portion 28 which constitutes the base portion 25 obliquely outwards so as to move away from each other towards a fitting portion 26 side. The pair of arm portions 30, 30 have the same shape. Outer surfaces 30a, 30a of the pair of arm portions 30, 30 constitute surfaces which continue evenly to the outer circumferential surface of the stopper portion 28 with no step defined therebetween. A plurality of projecting portions or elongated projections may be provided on the outer surfaces 30a, 30a of the pair of arm portions 30, 30 and the outer circumferential surface of the stopper portion 28 so as to project therefrom or a satin-like embossed finish may be applied thereto.

The arm portions 30 extend in the way described above with a predetermined width maintained therealong, and a slit 31 of a predetermined length is formed in an interior of each arm portion 30 in an extending direction thereof.

A projection 32 is provided on an inner surface of a distal end portion of each arm portion 30 in the extending direction so as to project therefrom (refer to FIG. 2A). As shown in FIG. 4C, the projections 32 are brought into abutment with the outer circumferential surface 25a of the base portion 25 when the openable and closable body 3 opens, the stopper portion 28 then comes into abutment with the restricting portion 46, which will be described later, of the receiving recess portion 40, and the pair of arm portions 30, 30 are held in a diametrically bent state by the holding portion 45, which will be described later, of the receiving recess portion 40.

A notched portion 33 is formed on an inner surface of a proximal end portion of each of the pair of arm portions 30 to facilitate an elastic deformation thereof when the openable and closable body 3 is closed. Namely, with the notched portions 33 so provided, the arm portions 30 are elastically deformed so that the inner surfaces of the proximal end portions of the arm portions 30 come into abutment with the outer circumferential surface 25a of the base portion 25 with almost no gap defined therebetween (refer to FIGS. 4B and 4C). With no notched portion 33 provided, when the arm portions 30 are deformed elastically, a gap is generated between the inner surfaces of the proximal end portions of the arm portions 30 and the outer circumferential surface 25a of the base portion 25, making it difficult for the arm portions 30 to be deformed.

In this embodiment, as shown in FIG. 4C, when the openable and closable body 3 opens, bringing the stopper portion 28 into abutment with the restricting portion 46, which will be described later, of the receiving recess portion 40, the outer surfaces 30a, 30a of the pair of arm portions 30, 30 are brought into surface contact with the contact surfaces 45a, 45a of the holding portion 45, which will be described later.

In this embodiment, when the openable and closable body 3 opens, bringing the stopper portion 28 into abutment with the restricting portion 46 of the receiving recess portion 40, the pair of arm portions 30, 30 are held by the contact surfaces 45a, 45a of the holding portion 45 and the outer circumferential surface 25a of the base portion 25 therebetween (refer to FIG. 4C).

The arm portions may not include the slits 31, the projections 32 and the notched portions 33, and the shape of the arm portions is not specifically limited. A plurality of pairs of arm portions may be provided. In this embodiment, the arm portions extend from the outer circumferential surface of the stopper portion 28 of the base portion 25, however, the arm portions may extend from an outer circumferential surface of the fitting portion 26.

The elastic resin member 20 has the bridge portion 35 which not only couples together distal end portions of the pair of arm portions 30, 30 but also elastically deforms in association with an elastic deformation of the pair of arm portions 30, 30. In this embodiment, the bridge portion 35 is curved into an arc-like shape to couple together the distal end portions of the pair of arm portions 30, 30 in the extending direction thereof.

In this embodiment, the elastic resin member 20 is formed substantially into a fan-like shape by the base portion 25, the pair of arm portions 30, 30 and the bridge portion 35.

As shown in FIGS. 4A to 4C, while this bridge portion 35 elastically deforms as the pair of arm portions 30, 30 elastically deform, the bridge portion 35 is brought into abutment with an end portion (a bridge abutment portion 47, which will be described later) of an inner circumference of the receiving recess portion 40 provided on the fixed body 1 which is positioned at an opposite side to a side where the holding portion 45 is provided to thereby be elastically restored to its original arc-like shape when the openable and closable body 3 is closed relative to the opening portion 2 in the fixed body 1 (refer to imaginary lines in FIG. 4C).

In this embodiment, the bridge portion 35 couples together the pair of arm portions 30, 30 directly, however, the bridge portion 35 may couple together the pair of arm portions 30, 30 via the base portion (this configuration will be described in a latter embodiment). The shape of the bridge portion is not limited to the arc-like shape, and hence, the bridge portion may have a ridge-like shape or the like. Thus, the shape of the bridge portion is not limited to any specific shape, however, the bridge portion preferably has a shape which protrudes in an opposite direction to a direction in which the openable and closable body opens due to the bridge portion being brought into abutment with the opposite end portion to the restricting portion of the receiving recess portion when the openable and closable body is closed.

The base portion 25, the pair of arm portions 30, 30, the bridge portion 35 and the stopper portion 28, which have been described heretofore as making up the elastic resin member 20, are formed integrally from a predetermined elastic material which can absorb an impact from a mating member. In addition, in this embodiment, the base portion 25, the pair of arm portions 30, 30, the bridge portion 35 and the stopper portion 28 are all formed in the same thickness (refer to FIG. 2B). However, these constituent members may be formed partially thinner or thicker. Then, for example, rubber material such as butyl rubber (isobutylene-isoprene rubber: IIR), nitrile rubber (NBR), ethylene propylene rubber (EPM, EPDM), butadiene rubber (BR), urethane rubber, silicone rubber, fluororubber, acrylic rubber and the like, thermoplastic elastic elastomer and the like can preferably be used as elastic material from which the elastic resin member 20 is formed. It is preferable to use, in particular, elastic material having low impact resilience (a great impact absorption capability) and difficult to rebound when the stopper portion. 28 is brought into abutment with the holding portion 45 of the receiving recess portion 40.

On the other hand, as shown in FIGS. 3A to 4C, the receiving recess portion 40 of this embodiment has the introducing portion 43 with which the pair of arm portions 30, 30 are brought into abutment to be bent diametrically towards each other when the openable and closable body 3 opens to move the elastic resin member 20, the restricting portion 46 with which the stopper portion 28 is brought into abutment to restrict the openable and closable body 3 from opening and the holding portion 45 configured to hold the pair of arm portions 30, 30 in the diametrically bent state when the stopper portion 28 is brought into abutment with the restricting portion 46. This receiving recess portion 40 is provided on an inner surface of the opening portion of the fixed body 1.

Figure 5:
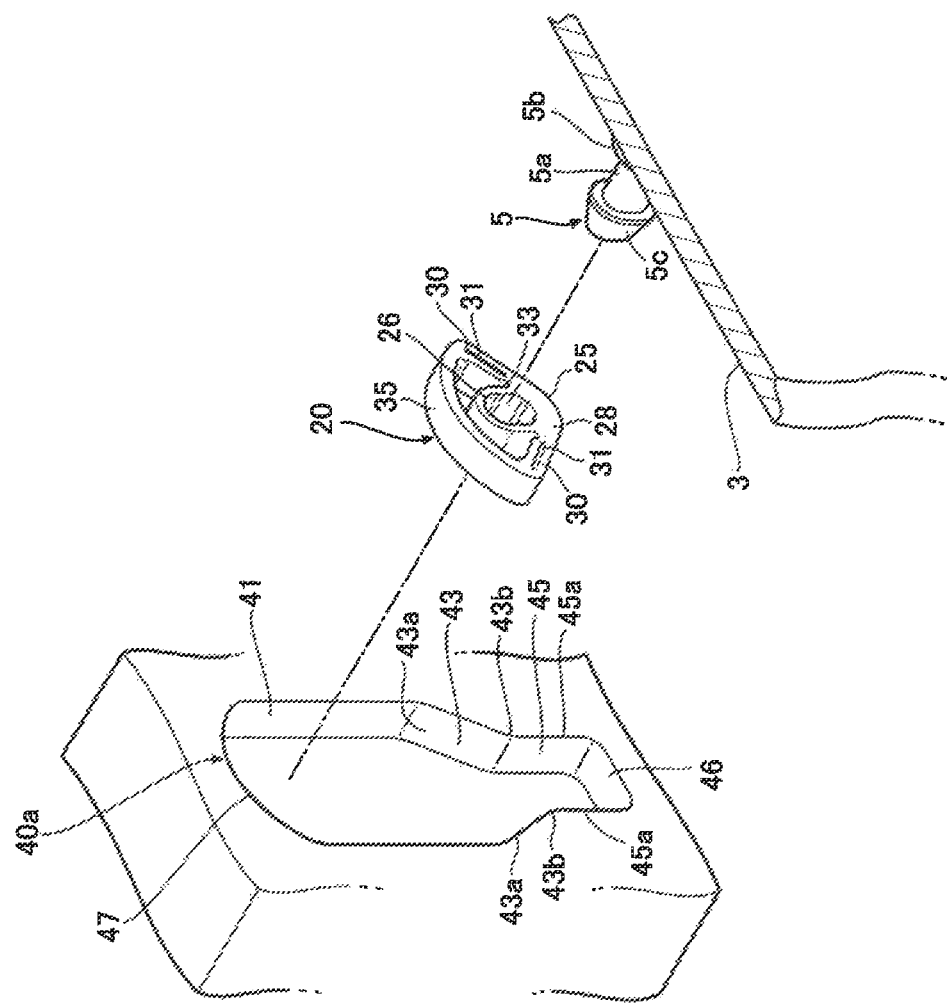
FIG. 5 is a perspective view showing a different configuration of a receiving recess portion of the damper device.

In addition, as shown in FIG. 1, the receiving recess portion 40 of this embodiment is provided in a recess portion forming material 7 which is placed on the inner surface of the opening portion 2 of the fixed body 1 and has an opening which faces an opening portion 2 side of the fixed body 1. The receiving recess portion 40 of this embodiment is formed into the shape of a hole formed to penetrate the recess portion forming material 7. However, as with a receiving recess portion 40a shown in FIG. 5, the receiving recess portion 40 may be formed into the shape of a recess which does not penetrate the recess forming material 7, and hence, the shape of the receiving recess portion 40 is not limited to any particular shape. Namely, when used with the receiving recess portion in the invention, the "recess portion" includes in meaning not only a hole which penetrates the recess portion forming material 7 but also a recess which does not penetrate the recess portion forming material 7.

Further, although the receiving recess portion 40 of this embodiment is formed in the recess portion forming material 7 which is separate from the opening portion 2 of the fixed body 1, there is imposed no specific limitation on where to form the receiving recess portion, and hence, the receiving recess portion may be provided directly on the inner surface of the opening portion 2 of the fixed body 1. In FIG. 1, although the receiving recess portion 40 has a curved shape so as to follow the opening direction of the openable and closable body 3, in FIGS. 3A to 4C, the receiving recess portion 40 is illustrated as having a rectilinear shape as a matter of conveniences in description.

Additionally, as shown in FIGS. 3A to 4C, the receiving recess portion 40 of this embodiment has a guide portion 41 which extends with a constant width therealong to such an extent that the pair of arm portions 30, 30 are not elastically deformed to guide a movement of the elastic resin member 20. In FIGS. 3A to 4C, although the guide portion 41 is illustrated as having the rectilinear shape, the guide portion 41 may of course be curved as shown in FIG. 1.

As shown in FIG. 3A, the introducing portion 43 is formed at one end of the guide portion 41 in its extending direction and has tapered inner surfaces 43a, 43a which are tapered from the one end so as to narrow gradually a space defined therebetween. The inner surfaces 43a, 43a of this introducing portion 43 come into abutment with the outer surfaces 30a, 30a of the pair of arm portions 30, 30 as the elastic resin member 20 moves, whereby the pair of arm portions 30, 30 are bent diametrically towards each other (refer to FIGS. 4A and 4B). A narrowest portion of the introducing portion 43 constitutes narrow end portions 43b, 43b.

Further, as shown in FIG. 3A, the holding portion 45 is provided so as to continue from the introducing portion 43. This holding portion 45 extends from the narrow end portions 43b of the introducing portion 43 in a constant width which is narrower than those of the guide portion 41 and the introducing portion 43 and has contact surfaces 45a, 45a which are parallel to each other. As shown in FIG. 4C, this holding portion 45 is designed to hold the pair of arm portions 30, 30 in the diametrically bent state when the stopper portion 28 comes into abutment with the restricting portion 46. The contact surfaces 45a, 45a of the holding portion 45 are brought into surface contact with the outer surfaces 30a, 30a of the pair of arm portions 30, 30 when the stopper portion 28 comes into abutment with the restricting portion 46. However, the contact surfaces 45a, 45a do not always have to extend in the constant width therealong. For example, the contact surfaces 45a, 45a may be formed substantially into an inverted fan shape which expands gradually diametrically towards one end portion of the receiving recess portion. Further, a projecting portion may be provided on each of inner surfaces of the holding portion so as to project therefrom so that an end face of the projecting portion constitutes a contact surface. Thus, there is imposed no specific limitation on the contact surfaces 45a, 45a of the holding portion 45.

Then, the restricting portion 46 is provided at the one end portion of the receiving recess portion 40 via the holding portion 45, and when the stopper portion 28 comes into abutment therewith, the restricting portion 46 restricts the openable and closable body 3 from opening. In this embodiment, the restricting portion 46 is provided to connect to distal end portions of the pair of contact surfaces 45a, 45a of the holding portion 45 in such a way as to be at right angles to a traveling direction of the elastic resin member 20 which travels within the receiving recess portion 40. In addition, a predetermined clearance is formed between corner portions defined between the restricting portion 46 and the contact surfaces 45a, 45a of the holding portion 45 and the stopper portion 28 when the stopper portion 28 comes into abutment with the restricting portion 46 (refer to FIG. 4C).

In addition, the bridge abutment portion 47 is formed at the end portion of the inner circumference of the receiving recess portion 40 which is positioned opposite to the end portion where the restricting portion 46 is provided. This bridge abutment portion 47 comes into abutment with the bridge portion 35 to deform the bridge portion 35 elastically when the openable and closable body 3 is closed (refer to FIG. 4C and FIG. 3A).

The shape of the receiving recess portion described above is an example, and no specific limitation is imposed on the shape of the receiving recess portion, provided that the receiving recess portion has the introducing portion which comes into abutment with the arm portions to bend them diametrically towards each other and the restricting portion which comes into abutment with the stopper portion to restrict the openable and closable body from opening.

Next, the working effect of the damper device 10 configured in the way described above will be described.

In the damper device 10, the projecting portion 5 provided on the openable and closable body 3 side is inserted into the fitting portion 26 of the elastic resin member 20, so that the shaft portion 5a of the projecting portion 5 is fitted in the fitting portion 26, while the flange portion 5b of the projecting portion 5 is abutted to the hole circumferential edge portion of the rear side of the fitting portion 26 so that the distal end portion 5c of the projecting portion 5 is brought into engagement with the front hole circumferential edge portion of the fitting portion 26, this allowing the elastic resin member 20 to be mounted on the projecting portion 5.

As this occurs, as show in FIG. 2A, due to the fact that the fitting portion 26 has the elongated hole shape which matches the shape of the shaft portion 5a of the projecting portion 5, the elastic resin member 20 can be restricted from rotating relative to the projecting portion 5 by inserting the shaft portion 5a into the fitting portion 26 to be fitted therein. With the shaft portion 5a of the projecting portion 5 fitted in the fitting portion 26, the plurality of protuberant portions 27 on the inner circumference of the fitting portion are in abutment with the outer circumference of the shaft portion 5a. This can not only absorb dimensional variations in relation to a bore diameter of the fitting portion 26 and an outside diameter of the shaft portion 5a of the projecting portion 5 but also allow the elastic resin member 20 to be mounted on the projecting portion 5 while suppressing the generation of looseness or rattling of the elastic resin member 20 (refer to FIG. 2A).

Then, as shown in FIG. 3A, when the openable and closable body 3 starts opening from a state in which the opening portion 2 in the fixed body 1 is closed by the openable and closable body 3, the elastic resin member 20 moves while being guided by the guide portion 41 of the receiving recess portion 40.

Then, the distal end portions of the pair of arm portions 30, 30 come into abutment with the inner surfaces 43a, 43a of the introducing portion 43 (refer to FIG. 3B). Then, when the elastic resin member 20 moves further, as shown in FIG. 4A, the inner surfaces 43a, 43a of the introducing portion 43 come into abutment with the outer surfaces 30a, 30a of the pair of arm portions 30, 30, whereby the pair of arm portions 30, 30 are elastically deformed to be bent diametrically towards each other. As the pair of arm portions 30, 30 are so bent, the bridge portion 35 is elastically deformed substantially into a ridge-like shape.

Thereafter, as shown in FIG. 4B, the outer surfaces 30a, 30a of the pair of arm portions 30, 30 are pressed strongly by the narrow end portions 43b, 43b of the introducing portion 43, whereby the pair of arm portions 30, 30 are elastically deformed to be bent diametrically towards each other while collapsing the slits 31, and the bridge portion 35 is also deformed elastically. In this state, the inner surfaces of the arm portions 30 are in abutment with the outer circumferential surface 25a of the base portion 25, and the arm portions 30 are held between the inner surfaces 43a of the introducing portion 43 and the contact surfaces 45a of the holding portion 45 and the outer circumferential surface 25a of the base portion 25.

Further, as shown in FIG. 4C, when the stopper portion 28 of the elastic resin member 20 comes into abutment with the restricting portion 46, the opening of the openable and closable body 3 is restricted, and the outer surfaces 30a, 30a of the pair of arm portions 30, 30 come into abutment with the contact surfaces 45a, 45a of the holding portion 45 for surface contact. Then, the arm portions 30 are held between the contact surfaces 45a of the holding portion 45 and the outer circumferential surface 25a of the base portion 25, whereby the pair of arm portions 30, 30 are held in the diametrically bent state, and the openable and closable body 3 can be opened. Additionally, the bridge portion 35 is deformed to project towards the bridge abutment portion 47 side of the receiving recess portion 40, whereby the bridge portion 35 is elastically deformed substantially into the shape of □, and the projections 32, 32 provided on the inner surfaces of the arm portions so as to project therefrom come into abutment with the outer circumferential surface 25a of the base portion 25.

In this way, in the damper device 10, when the openable and closable body 3 is opened, the introducing portion 43 elastically deforms the pair of arm portions 30, 30 and the bridge portion 35, so that the stopper portion 28 comes into abutment with the restricting portion 46. Due to this configuration, a damper effect can be obtained without placing an air damper or the like when the openable and closable body is opened, and the openable and closable body 3 can be opened slowly.

Namely, the damper effect can be obtained by increasing the frictional resistance of the outer surfaces 30a, 30a of the pair of arm portions 30, 30 against the inner surfaces 43a, 43a of the introducing portion 43 as a result of the inner surfaces 43a, 43a of the introducing portion 43 coming into abutment with the outer surfaces 30a, 30a of the pair of arm portions 30, 30 to thereby deform elastically the pair of arm portions 30, 30 in such a way as to be bent diametrically towards each other, the pair of arm portions 30, 30 being restored elastically to come into abutment with the inner surfaces 43a, 43a of the introducing portion 43, and the bridge portion 35 facilitating the elastic restoration of the pair of arm portions 30, 30 which are elastically deformed (the elastic restoration of the pair of arm portions 30, 30 becomes difficult without the bridge portion 35) (refer to FIGS. 4A and 4B). Further, the pair of arm portions 30, 30 are held in the diametrically bent state as a result of the elastic resin member 20 fitting in the holding portion 45 which is narrower than the introducing portion 43. Due to this, a higher damper effect is obtained by virtue of the frictional resistance of the outer surfaces 30a, 30a of the pair of arm portions 30, 30 against the contact surfaces 45a, 45a of the holding portion 45 (refer to FIG. 4C). In particular, in this embodiment, the pair of arm portions 30, 30 are elastically deformed greatly when the pair of arm portions 30, 30 pass through the narrow end portions 43b, 43b which constitute the narrowest portion of the introducing portion 43 (refer to FIG. 4B), whereby the high damper effect can be obtained.

Then, in this damper device 10, the elastic resin member 20 has the base portion 25, the pair of arm portions 30, 30, the bridge portion 35 and the stopper means (the stopper portion 28), and these constituent parts are formed integrally, whereby the structure of the damper device 10 can be simplified.

Additionally, in this embodiment, as described above, the receiving recess portion 40 has the holding portion 45 which holds the pair of arm portions 30, 30 in the diametrically bent state when the stopper portion 28 comes into abutment with the restricting portion 46 (refer to FIG. 4C), whereby the holding portion 45 can not only increase the frictional resistance against the pair of arm portions 30, 30 to obtain the high damper effect but also prevent the elastic resin member 20 from leaping back (rebounding) when the stopper portion 28 comes into abutment with the restricting portion 46.

Further, in this embodiment, the holding portion 45 has the contact surfaces 45a, 45a with which the outer surfaces 30a, 30a of the pair of arm portions 30, 30 are brought into surface contact when the stopper portion 28 comes into abutment with the restricting portion 46 of the receiving recess portion 40 (refer to FIG. 4C). Due to this, the damper effect when the openable and closable body 3 opens can be enhanced further. In addition, the elastic resin member 20 can be prevented further from leaping back when the stopper portion 28 comes into abutment with the restricting portion 46.

In this embodiment, as shown in FIG. 4C, when the stopper portion 28 comes abutment with the restricting portion 46 of the receiving recess portion 40, the pair of arm portions 30, 30 are held between the contact surfaces 45a, 45a of the holding portion 45 and the outer circumferential surface 25a of the base portion 25. Due to this, not only can the damper effect when the openable and closable body 3 is opened be enhanced further, but also the elastic resin member 20 can be prevented further from leaping back when the stopper portion 28 comes into abutment with the restricting portion 46.

In this embodiment, the projections 32, 32 are provided on the inner surfaces of the pair of arm portions 30, 30 so as to project therefrom, so that the projections 32, 32 come into abutment with an outer circumference of the base portion 25 when the openable and closable body 3 opens, bringing the stopper portion 28 into abutment with the restricting portion 46, whereby the pair of arm portions 30, 30 are held in the diametrically bent state by the holding portion 45 (refer to FIG. 4C). Due to this, the elastic resin member 20 can be prevented more effectively from leaping back when the stopper portion 28 comes into abutment with the restricting portion 46.

In this embodiment, forming the slits 31 inside the arm portions 30 provides the following advantage. Namely, as shown in FIG. 4C, in the case where the elastic resin member 20 fits in the holding portion 45 of the receiving recess portion 40 so that an axis C of the projecting portion 5 is positioned aligned with a center line L extending along an axial direction at a center of the receiving recess portion 40 in relation to a width direction thereof, the pair of arm portions 30, 30 are held bent diametrically towards each other with the slits 31, 31 collapsed uniformly. However, there may be a case where the axis C of the projecting portion 5 deviates from the center line L of the receiving recess portion 40. As this occurs, collapsing amounts of the pair of slits 31, 31 differ from each other (one slit 31 collapses more greatly than the other slit 31) to thereby absorb the positional deviation described above, whereby the pair of arm portions 30, 30 can be held in the holding portion 45 in an ensured fashion while being bent diametrically towards each other.

When the openable and closable body 3 is closed from the state in which the pair of arm portions 30, 30 are held bent diametrically towards each other in the holding portion 45 of the receiving recess portion 40 as a result of the openable and closable body 3 being opened (refer to FIG. 4C), the pair of arm portions 30, 30 are dislocated from the holding portion 45, and the elastic resin member 20 moves towards the bridge abutment portion 47 side of the receiving recess portion 40. As this occurs, although it is desirable that the bridge portion 35 is restored elastically quickly to allow the pair of arm portions 30, 30 to expand, there may be a case where the bridge portion 35 and the pair of arm portions 30, 30 are not restored elastically quickly as a result of the elastic resin member 20 getting worn due to deterioration with age.

Even though that occurs, in this embodiment, when the openable and closable body 3 is closed, the bridge portion 35 of the elastic resin member 20 is brought into abutment with the end portion (the bridge abutment portion 47) of the inner circumference of the receiving recess portion 40 which is positioned opposite to the end portion where the restricting portion 46 is provided to be deformed elastically. Due to this, the pair of arm portions 30, 30 can be expanded to move away from each other via the bridge portion 35 which is brought into abutment with the bridge abutment portion 47 to be elastically deformed when the openable and closable body 3 is closed, thereby making it possible to prevent the pair of arm portions 30, 30 from becoming difficult to be expanded due to getting worn. Additionally, the damper effect can be obtained as a result of the bridge portion 35 being brought into abutment with the bridge abutment portion 47 of the receiving recess portion 40 when the openable and closable body 3 is closed, whereby not only can the openable and closable body 3 be closed slowly, but also the generation of looseness or rattling of the openable and closable body 3 can be suppressed when the openable and closable body 3 is in the closed state.

In this embodiment, as shown in FIG. 4C, when the openable and closable body 3 is opened, the stopper portion 28 of the elastic resin member 20 is brought into abutment with the restricting portion 46 of the receiving recess portion 40 with the predetermined clearance defined relative to the corner portions defined between the restricting portion 46 and the contact surfaces 45a, 45a of the holding portion 45. Thus, when the stopper portion 28 is brought into abutment with the restricting portion 46 whereby the stopper portion 28 is deformed elastically, an elastically deformed portion of the stopper portion 28 is allowed to be released into the clearance, whereby the leaping back of the elastic resin member 20 can be suppressed more effectively (in the case where the restricting portion and the contact surfaces of the holding portion match in shape the outer circumferential surface of the stopper portion, when the stopper portion is elastically deformed, there is left no space into which the elastically deformed portion of the stopper is allowed to be released, whereby the elastic resin member becomes easy to leap back).

FIGS. 6A to 7D show a second embodiment of a damper device of the invention. It should be noted that like reference numerals will be given to substantially like portions of the second embodiment to those of the previous embodiment, and a description of those like portions will be omitted here.

A damper device 10A of this embodiment differs from the damper device 10 of the previous embodiment in the structure of an elastic resin member.

Figure 6A:
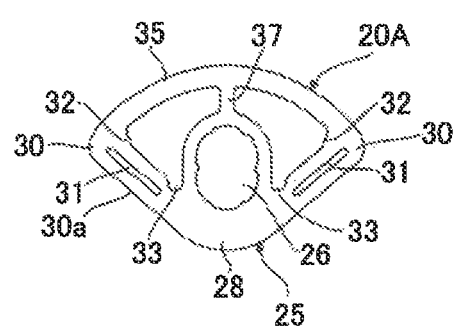
FIGS. 6A to 6D show a second embodiment of a damper device of the invention.
Figure 6B:
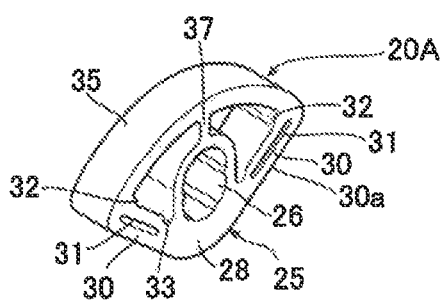

Namely, as shown in FIGS. 6A and 6B, in the structure of this elastic resin member 20A, a base portion 25 and a bridge portion 35 are coupled to each other by a coupling portion 37 which extends from an inner circumference of the bridge portion 35 towards the base portion 25. In this embodiment, an outer circumferential surface of a central portion of a bridge portion side end portion of the base portion 25 and an inner circumferential surface of a longitudinal central portion of the bridge portion 35 are coupled to each other by the coupling portion 37.

Figure 6C:
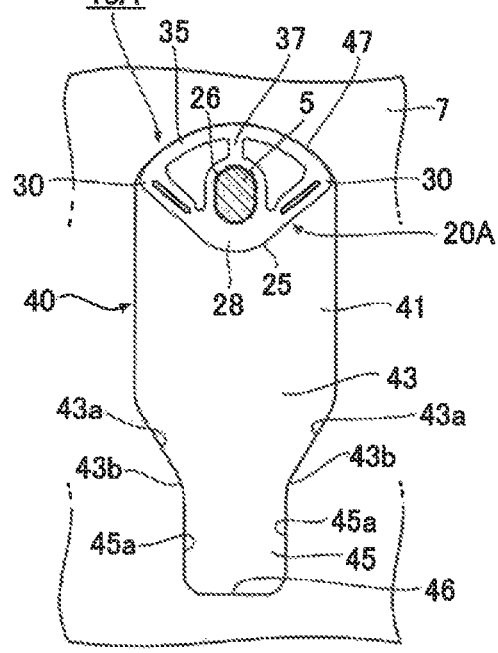
Figure 6D:
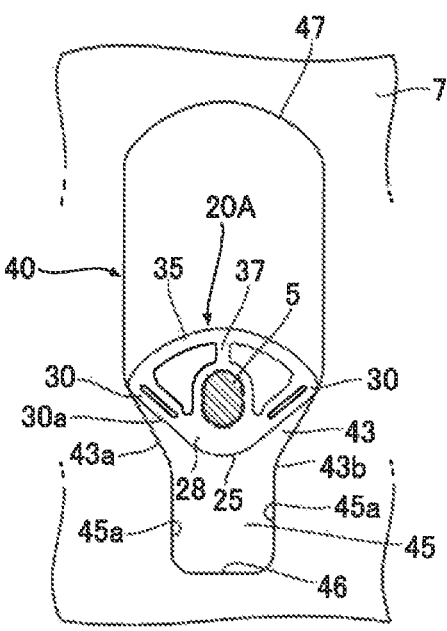

Then, in this embodiment, when an openable and closable body 3 is opened from a state shown in FIG. 6C, a pair of arm portions 30, 30 are brought into abutment with an introducing portion 43 of a receiving recess portion 40 (refer to FIG. 6D), and thereafter, as shown in FIG. 7A, the pair of arm portions 30, 30 deform elastically, and the bridge portion 35 deforms elastically in such a manner that two ridges continue via the coupling portion 37 as a fulcrum. Further, as shown in FIG. 7B, the pair of arm portions 30, 30 deform elastically, and the bridge portion 35 deforms elastically substantially into a Y-shape. Then, as shown in FIG. 7C, the pair of arm portions 30, 30 are held bent diametrically towards each other by a holding portion 45, and a stopper portion 28, which is a stopper means, comes into abutment with a restricting portion 46 of a receiving recess portion 40. Thus, the openable and closable body 3 can be opened while obtaining a damper effect.

In this embodiment, the base portion 25 and the bridge portion 35 of the elastic resin member 20A are coupled to each other by the coupling portion 37, and therefore, even though the pair of arm portions 30, 30 and the bridge portion 35 are formed thin, an appropriate elastic force can be obtained, whereby a desired damper effect can be exhibited.

FIGS. 8A to 9C show a third embodiment of a damper device of the invention. It should be noted that like reference numerals will be given to substantially like portions of the third embodiment to those of the previous embodiments, and a description of those like portions will be omitted here.

In the structure of a damper device 10B of this embodiment, bridge portions 35 are coupled together indirectly via a base portion 25.

Namely, as shown in FIGS. 8A and 8B, in an elastic resin member 20B of this embodiment, a bridge portion 35 coupled to a distal end portion of one arm portion 30 is coupled to an outer circumferential surface of the base portion 25 via a coupling portion 37, and a bridge portion 35 coupled to a distal end of the other arm portion 30 is coupled to the outer circumferential surface of the base portion 25 via a coupling portion 37.

Figure 9A:
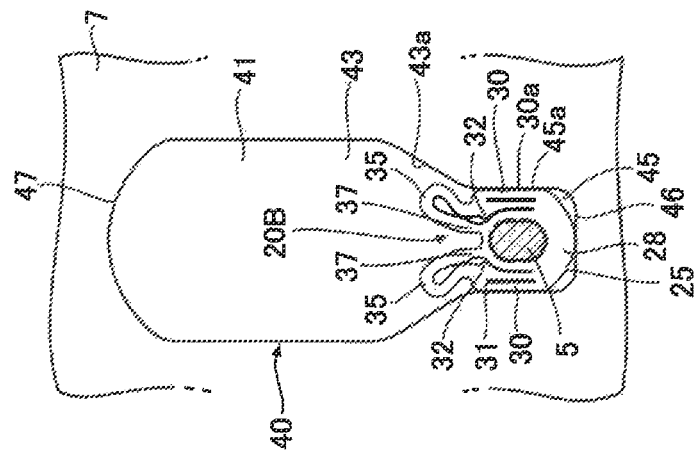
FIGS. 9A to 9C show the damper device of the third embodiment of the invention in use.
Figure 9B:
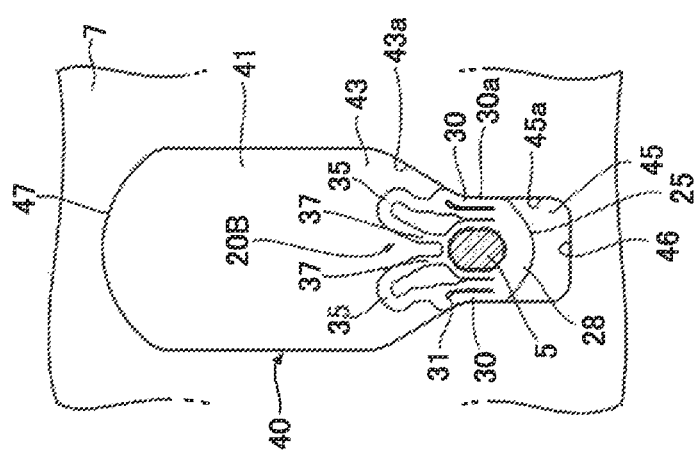
Figure 9C:
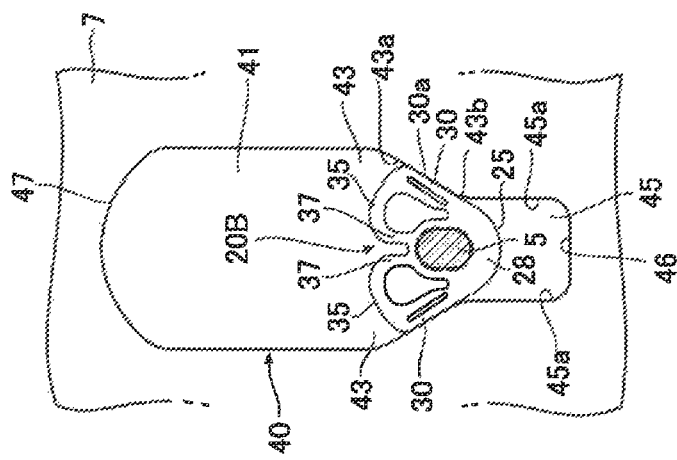

Then, in this embodiment, when an openable and closable body 3 is opened from a state shown in FIG. 8C, the pair of arm portions 30, 30 come into abutment with an introducing portion 43 of a receiving recess portion 40 (refer to FIG. 8D), and thereafter, as shown in FIG. 9A, the pair of arm portions 30, 30 and the plurality of bridge portions 35 deform elastically. Further, as shown in FIG. 9B, one of the arm portions 30 and one of the bridge portions 35 and the other of the arm portions 30 and the other of the bridge portions 35 deform elastically substantially into a U-shape. Then, as shown in FIG. 9C, the arm portions 30 and the bridge portions 35, which have deformed elastically substantially into the U-shape, deform elastically further into a collapsed shape. Then, a stopper portion 28, which is a stopper means, comes into abutment with a restricting portion 46 with the arm portions 30 and the bridge portions 35 held bent diametrically towards each other, whereby the openable and closable body 3 can be opened while obtaining a damper effect.

FIGS. 10A to 15 show a fourth embodiment of a damper device of the invention. It should be noted that like reference numerals will be given to substantially like portions of the fourth embodiment to those of the previous embodiments, and a description of those like portions will be omitted here.

A damper device 10C of this embodiment differs from the first to third embodiments in positional relationship between a base portion 25C and arm portions 30C of an elastic resin member 20C.

Figure 10A:
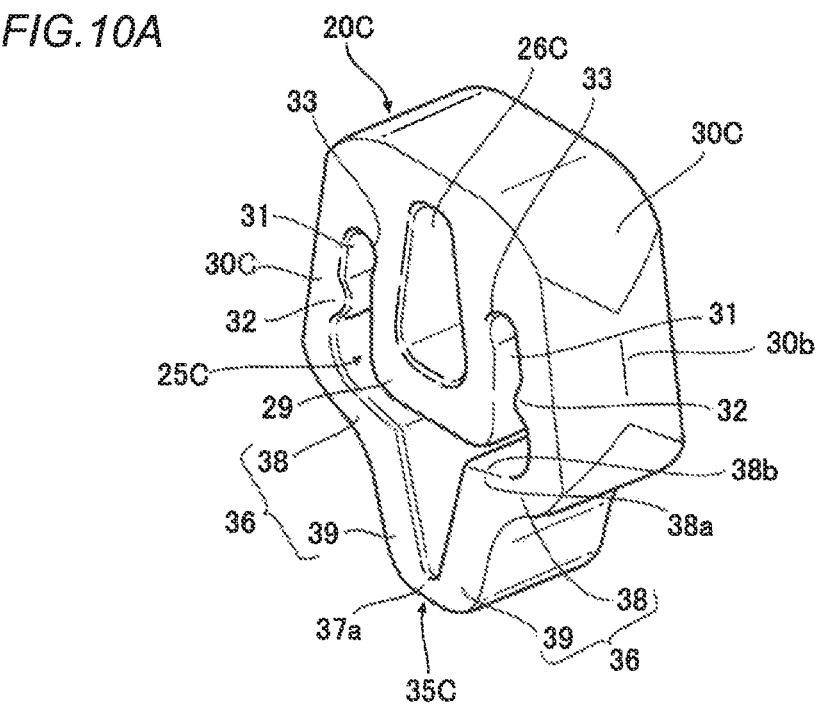
FIGS. 10A and 10B show a fourth embodiment of a damper device of the invention.
Figure 10B:
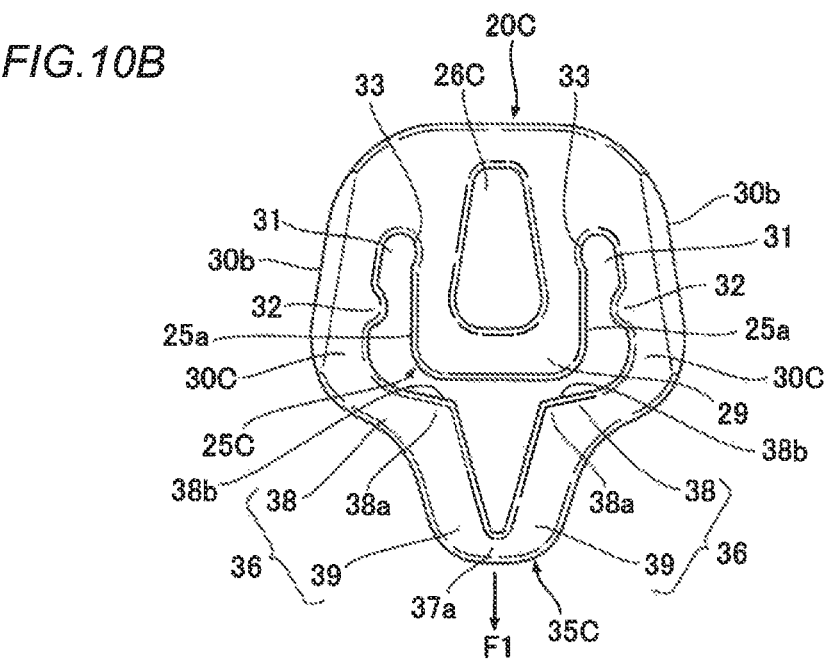

Namely, as shown in FIGS. 10A and 10B, the elastic resin member 20C of this embodiment has the base portion 25C, the pair of arm portions 30C, 30C and a bridge portion 35C. However, although the stopper portion 28, which is the stopper means, is not provided at the other longitudinal end of the base portion 25 in the first to the third embodiments, the bridge portion 35C has a stopper means in this embodiment. It should be noted that when referred to in this invention, the "bridge portion has a stopper means" includes in meaning a case where the bridge portion is integrated with the stopper means (that is, the bridge portion itself constitutes the stopper means) and a case where the bridge portion has a stopper means which differs from the bridge portion. In this embodiment, the bridge portion 35C itself constitutes a stopper means.

Figure 11:
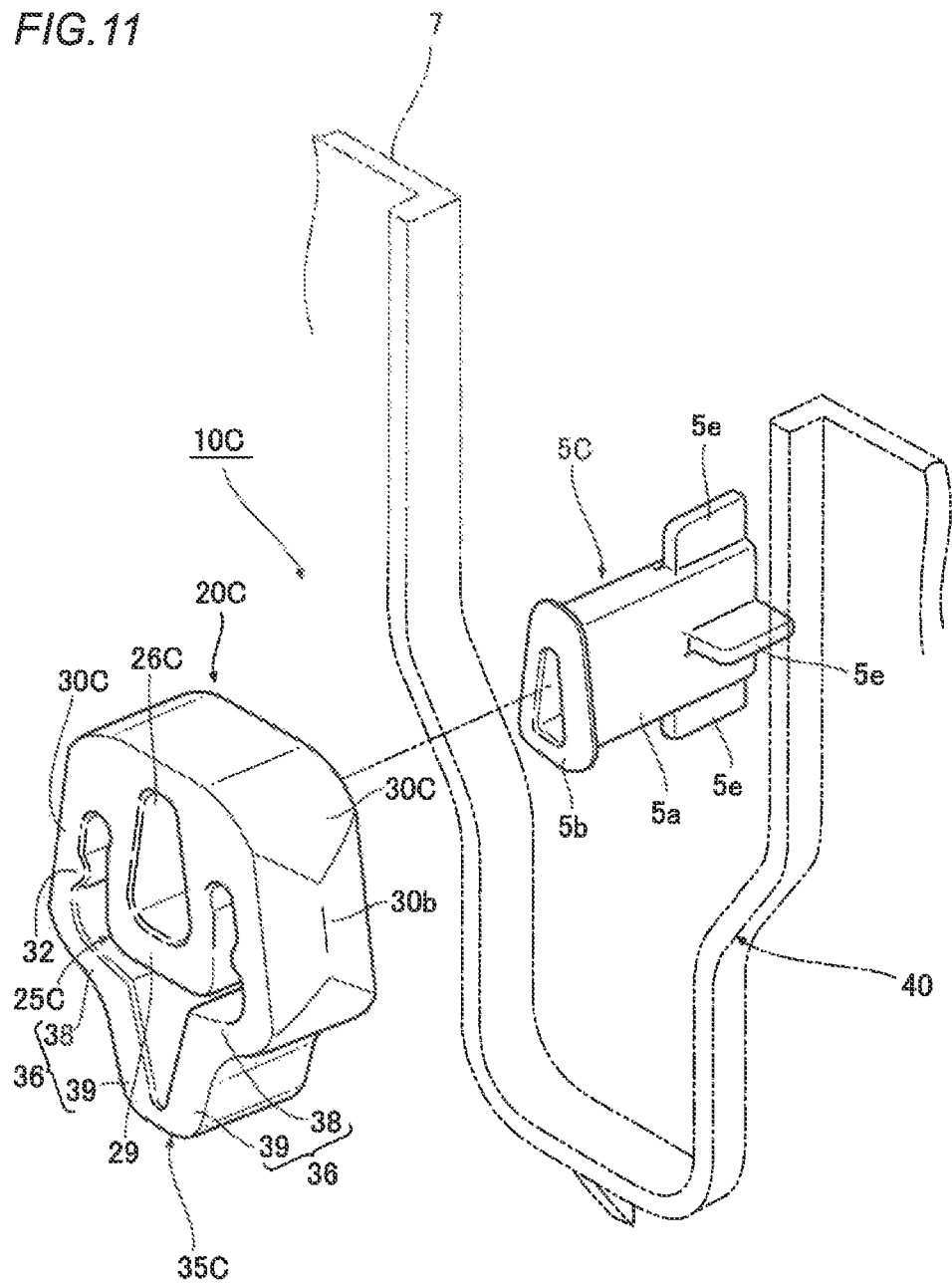
FIG. 11 is a perspective view showing a mounting relationship of the damper device of the fourth embodiment of the invention with a projecting portion.

As shown in FIG. 11, in this embodiment, a projecting portion 5C provided on an openable and closable body 3 has a cylindrical shaft portion 5a extending long in one direction and rounded at longitudinal ends thereof to have a substantially trapezoidal cross section, a flange portion 5b formed on an outer circumference of a distal end of the shaft portion 5a, and a plurality of ribs 5e provided on an outer circumference of a proximal end side of the shaft portion 5a.

Then, as shown in FIG. 10B, the base portion 25C has a fitting portion 26C into which the projecting portion 5C fits at a center thereof and is formed substantially into a quadrangular shape. The fitting portion 26C is formed substantially into the shape of a trapezoidal hole which is narrow at one longitudinal end and wide at the other longitudinal end and which is rounded at the longitudinal ends to match the projecting portion 5C. Providing the fitting portion 26 configured in the way described above can make thick circumferential edge portions and the vicinities thereof of cut-out portions 33, which will be described later, on a pair of side wall portions of the base portion 25C, as a result of which it becomes difficult for a crack to be generated in coupling portions between the arm portions 30C and the base portion 25 or for the coupling portions to be damaged when the arm portions 30C deform elastically (in the case where the fitting portion is formed merely into the shape of an elongated hole, the side wall portions of the base portion are made thin by the cut-out portions, as a result of which it becomes easy for a crack to be generated in the coupling portions between the arm portions and the base portion or for the coupling portions to be damaged when the arm portions deform elastically).

Further, the pair of arm portions 30C, 30C extend from longitudinal end sides of outer circumferential surfaces 25a, 25a on both sides of the base portion 25C, and an abutment portion 29, having a shape which is at right angles to a longitudinal direction of the base portion 25C, is provided at the other longitudinal end side of the base portion 25C. It is this abutment portion 29 that comes into abutment with inner surfaces of a pair of inclined portions 36, 36, which will be described later, of the bridge portion 35C when the openable and closable body 3 opens to cause the elastic resin member 20C to move and the bridge portion 35C constituting a stopper means comes into abutment with a restricting portion 46 of a receiving recess portion 40 (refer to FIG. 13B).

In addition, as shown in FIG. 10B, the pair of arm portions 30C, 30C extend from the longitudinal end sides of both the outer circumferential surfaces 25a, 25a of the base portion 25C in an opening direction F1 in which the openable and closable body 3 opens relative to an opening portion 2 so as to move away from each other via slits 31 defined between the base portion 25C and themselves. It should be noted that the pair of arm portions 30C, 30C may extend parallel to each other, and hence, no specific limitation is imposed on how the pair of arm portions 30C, 30C extend.

Projections 32 are provided individually on inner surfaces of the pair of arm portions 30C, 30C in a position located nearer to distal ends in their extending direction (refer to FIG. 10B). The projections 32 are brought into abutment with the pair of outer circumferential surfaces 25a, 25a which extend along the longitudinal direction of the base portion when the openable and closable body 3 opens and the bridge portion 35C, which constitutes the stopper means, comes into the restricting portion 46 of the receiving recess portion 40 whereby the pair of arm portions 30C, 30C are held bent diametrically towards each other by a holding portion 45 (refer to FIG. 13B). Providing the projections 32 ensures gaps (the slits 31) between the inner surfaces of the pair of arm portions 30C, 30C and the corresponding outer circumferential surfaces 25a, 25a of the base portion 25C even in such a state that the bridge portion 35C *comes* into abutment with the restricting portion 46 and the arm portions 30C, 30C are held bent diametrically towards each other by the holding portion 45, as shown in FIG. 15.

Further, arc-shaped cut-out portions 33 are formed individually at coupling portions of the pair of outer circumferential surfaces 25a, 25a of the base portion 25C with the corresponding arm portions 30C, 30C (refer to FIG. 10B), facilitating an elastic deformation of the pair of arm portions 30 when the openable and closable body 3 is closed.

Figure 15:
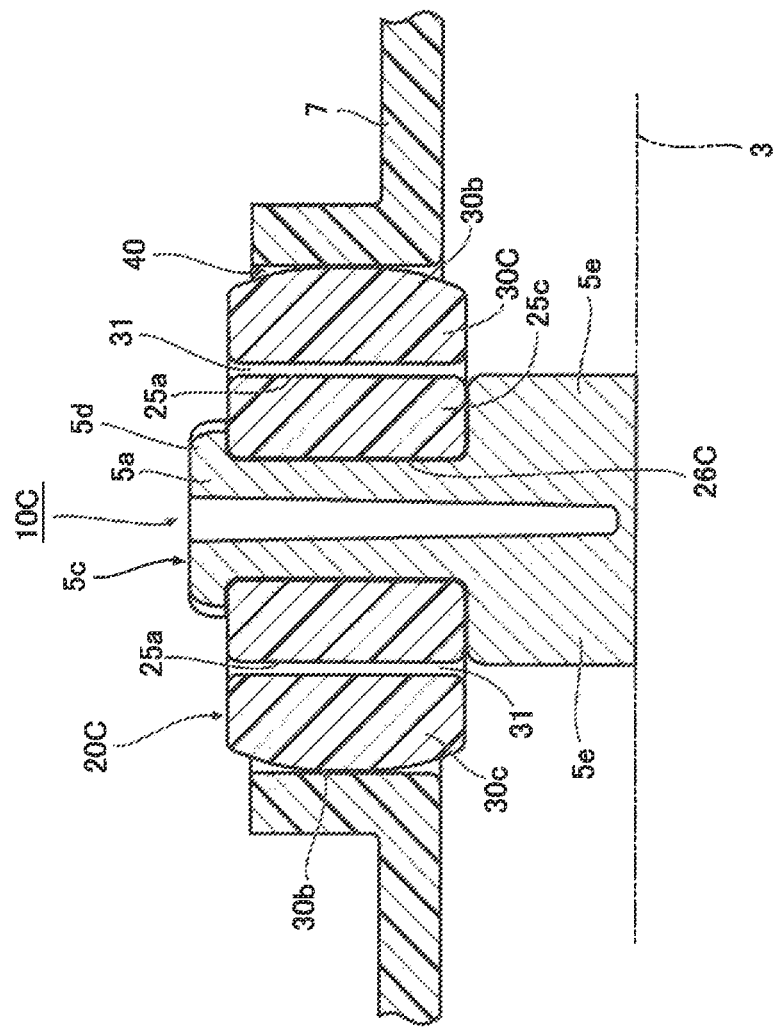
FIG. 15 is a sectional view taken along a line A-A shown in FIG. 13B and viewed in a direction indicated by arrows at ends of the line.

In addition, as shown in FIG. 15, outer surfaces 30b of the arm portions 30C exhibit a rounded curved shape when seen from the opening direction F1 of the openable and closable body 3. Due to this, even in a case where the elastic resin member 20C is mounted on the projecting portion 5C in an inclined fashion due to a dimensional variation of an outer circumference surface of the projecting portion 5C and an inner circumference of the fitting portion 26C of the elastic resin member 20C, a contact area of the outer surfaces 30b of the arm portions 30C with inner surfaces of the receiving recess portion 40 can be made constant, whereby the dimensional variation can flexibly be dealt with.

Then, the bridge portion 35C has a pair of inclined portions 36, 36 extending from distal end portions of the pair of arm portions 30C, 30C in their extending direction towards the opening direction F1 of the openable and closable body 3 in such a manner as to move towards each other, and the distal end portions are coupled to each other.

As shown in FIG. 10B, in this embodiment, the pair of inclined portions 36, 36 include first leg portions 38, 38 which extend from the distal end portions of the pair of arm portions 30C, 30C in their extending direction obliquely at a predetermined angle relative to the opening direction F1 so as to move towards each other and second leg portions 39, 39 which extend from distal end portions of the first leg portions 38, 38 in their extending direction obliquely at an angle steeper than the angle at which the first leg portions 38 extend obliquely relative to the opening direction F1 so as to move towards each other. Distal end portions of the second leg portions 39, 39 are coupled to each other via a distal end portion 37a, so that the second leg portions 39, 39 are formed substantially into a V-shape as a whole.

The bridge portion 35C is such that when the openable and closable body 3 opens, the distal end portion 37a thereof comes into abutment with the restricting portion 46 of the receiving recess portion 40 to thereby restrict the openable and closable body 3 from opening and hence functions as the "stopper means" of the invention (refer to FIGS. 13A and 13B). As this occurs, end portions 38a, 38a (refer to FIGS. 10A and 10B) of the first leg portions 38, 38 of the pair of inclined portions 36, 36 which are positioned to face each other come into abutment with each other, and in this state, further, the abutment portion 29 of the base portion 25C is allowed to come into abutment with inner surfaces 38b, 38b (refer to FIGS. 10A and 10B) of the first leg portions 38, 38 (refer to FIG. 13B).

In this embodiment, the pair of inclined portions 36, 36 are described as each having a configuration in which the two leg portions 38, 39 which extend obliquely at the different angles are coupled together at a halfway portion thereof. However, the pair of inclined portions 36, 36 may be formed by coupling together two leg portions which extend obliquely at the same angle so that the pair of inclined portions 36, 36 are formed into a shape which is closer to a V-shape as a whole. Thus, no specific limitation is imposed on the configuration of the pair of inclined portions 36, 36.

Thus, as has been described heretofore, in the elastic resin member 20C of the fourth embodiment, when compared with the elastic resin members 20, 20A, 20B of the first to third embodiments, the base portion and the bridge portion are positioned opposite. Namely, in the first to the third embodiments, the bridge portion 35 is disposed on the outer side of the one longitudinal end portion of the base portion 25 which is positioned at the opposite side to the opening direction F1. In contrast with this, in the fourth embodiment, the bridge portion 35C is disposed on the outer side of the other longitudinal end portion of the base portion 25C which is positioned on the opening direction F1 side.

Then, in this embodiment, when the openable and closable body 3 is opened in the opening direction F1 from a state in which the openable and closable body 3 is closed relative to the opening portion 2 of a fixed body 1 as shown in FIG. 12A, distal end portions of the outer surfaces 30b, 30b of the pair of arm portions 30C, 30C in their extending direction come into abutment with inner surfaces 43a, 43a of an introducing portion 43 of the receiving recess portion 40 as shown in FIG. 12B. When the openable and closable body 3 opens further, the arm portions 30C are pressed by the inner surfaces 43a of the introducing portion 43, whereby the pair of arm portions 30C, 30C elastically deform and are bent diametrically towards each other so that the arm portions 30C, 30C move towards the outer circumferential surfaces 25a, 25a of the base portion 25C. Then, as the arm portions 30C, 30C deform elastically in the way described above, the pair of inclined portions 36, 36 of the bridge portion 35C deform elastically in directions in which they are closed to each other (in directions in which they move towards each other), as shown in FIG. 12C.

Thereafter, when the openable and closable body 3 opens further, causing the pair of arm portions 30C, 30C to enter the holding portion 45, the outer surfaces 30b, 30b of the pair of arm portions 30C, 30C are pressed by contact surfaces 45a, 45a of the holding portion 45, whereby the pair of arm portions 30C, 30C which expand obliquely are elastically deformed so that the arm portions 30C become parallel to each other, and the bridge portion 35C is deformed elastically. Then, the end portions 38a, 38a of the first leg portions 38, 38 of the pair of inclined portions 36, 36 come into abutment with each other, and further, the distal end portion 37a of the bridge portion 35C comes into abutment with the restricting portion 46 of the receiving recess portion 40, whereby the openable and closable body 3 is restricted from opening (refer to FIG. 13A). In this state, the abutment portion 29 of the base portion 25C comes into partial abutment with the inner surfaces 38b, 38b of the first leg portions 38, 38 of the pair of inclined portions 36, 36 so as to generate a slight gap between the first leg portions 38, 38 and itself (refer to FIG. 13A).

Then, when the distal end portion 37a of the bridge portion 35C, which constitutes the stopper means, comes into abutment with the restricting portion 46 as shown in FIG. 13B, the bridge portion 35C leaps back by virtue of an elastic force thereof, causing the pair of inclined portions 36, 36 to attempt to expand in directions in which they move away from each other, and as the pair of inclined portions 36, 36 so attempt, the pair of arm portions 30C, 30C also attempt to expand slightly. As this occurs, as shown in FIG. 13B, the abutment portion 29 of the base portion 25C comes into abutment with the inner surfaces 38b, 38b of the first leg portions 38, 38 of the pair of inclined portions 36, 36 so as to be in surface contact therewith to such an extent that the gap defined until then is eliminated. This makes the abutment portion 29 and the first leg portions 38, 38 into a solid elastic body which is almost integral, and the resulting solid elastic body is held between the contact surfaces 45a, 45a of the holding portion 45, whereby the leaping back of the bridge portion 35C and the deformation of the arm portions 30C are restricted, and the openable and closable body 3 is maintained in a completely opened state.

In this way, in this embodiment, as shown in FIG. 13B, when the openable and closable body 3 opens as wide as possible, the end portions 38a, 38a of the first leg portions 38, 38 of the pair of inclined portions 36, 36 come into abutment with each other, and the abutment portion 29 of the base portion 25C comes into abutment with the inner surfaces 38b, 38b of the first leg portions 38, 38. Thus, the portions where the end portions 38a, 38a of the first leg portions 38, 38 are in abutment with each other and where the inner surfaces 38b, 38b of the first leg portions 38, 38 are in abutment with the abutment portion 29 of the base portion 25C become integral into a solid elastic body, and the resulting solid elastic body is held between the contact surfaces 45a, 45a of the holding portion 45, whereby the bridge portion 35C, which constitutes the stopper portion, can be restricted from leaping back (rebounding) when the bridge portion 35C collides with the restricting portion 46 of the receiving recess portion 40. In addition, an appropriate damper effect can be obtained due to the pair of arm portions 30C, 30C and the pair of inclined portions 36, 36 of the bridge portion 35C deforming elastically before the openable and closable body 3 opens as wide as possible.

In addition, with the openable and closable body 3 opened in the way described above, the pair of arm portions 30C, 30C are held between the contact surfaces 45a, 45a of the holding portion 45 and the outer circumferential surfaces 25a, 25a of the base portion 25C, whereby the pair of arm portions 30C, 30C are held bent diametrically towards each other, and the projections 32, 32 of the pair of arm portions 30C, 30C come into abutment with the outer surfaces 25a, 25a of the base portion 25C (refer to FIG. 13B) while ensuring the slits 31 between the outer circumferential surfaces 25a, 25a of the base portion 25C and the pair of arm portions 30C, 30C (refer to FIG. 15).

Then, in this embodiment, due to the bridge portion 35C which deforms elastically as the arm portions 30C deform elastically having the stopper means, even in the case where the stopper means of the bridge portion 35C (here, the distal end portion 37a of the bridge portion 35C) comes into abutment with the restricting portion 46 of the receiving recess portion 40, an elastic force can be imparted to the restricting portion 46, thereby making it possible to enhance the damper effect.

In this embodiment, the projections 32, 32 come into abutment with the outer circumferential surfaces 25a, 25a of the base portion 25C when the bridge portion 35C, which is the stopper means, comes into abutment with the restricting portion 46 of the receiving recess portion 40 whereby the pair of arm portions 30C, 30C are held bent diametrically towards each other by the holding portion 45. Due to this, when the pair of arm portions 30C, 30C are pressed by the holding portion 45 to deform elastically in closing the openable and closable body 3, since a constant pressing load can be applied to an outer circumference of the base portion at all times by bringing the projections 32, 32 into abutment with the outer circumferential surfaces 25a, 25a of the base portion 25C in an ensured fashion, the damper effect can be obtained stably. With no such projection, the inner surfaces of the pair of arm portions 30C, 30C tend to come into contact with the outer circumferential surfaces 25a, 25a of the base portion 25C easily, whereby, depending on the thickness of the arm portions 30C, the pressing load varies, making it difficult to obtain a stable damper effect.

On the other hand, when the openable and closable body 3 is closed from the state shown in FIG. 13B in which the openable and closable body 3 is completely opened, the elastic resin member 20C of this embodiment performs as follows. Namely; when the openable and closable body 3 is closed, a tensile force is applied to the base portion 25C of the elastic resin member 20C in a direction indicated by an arrow F2 as shown in FIG. 14A, and the abutment portion 29 of the base portion 25C moves away from the inner surfaces 38b, 38b of the first leg portions 38, 38 of the pair of inclined portions 36, 36 while the end portions 38a, 38a of the first leg portions 38, 38 of the pair of inclined portions 36, 36 are kept in abutment with each other as shown in FIG.

14B, As this occurs, since the pair of arm portions 30C, 30C extend from the outer circumferential surfaces 25a, 25a on both the sides of the base portion 25C towards the opening direction F1 in which the openable and closable body 3 opens relative to the opening portion 2 with the slits 31, 31 defined between the base portion 25C and themselves, when the openable and closable body 3 is closed from the state in which with the openable and closable body 3 opened, the elastic resin member 20C is received within the holding portion 45 of the receiving recess portion 40, the pair of arm portions 30C, 30C are pulled (refer to arrows in FIGS. 14A and 14B) via the projecting portion 5C of the openable and closable body 3 by the base portion 25C which is pulled towards the closing direction F2 of the openable and closable body 3, whereby the force is applied in a direction in which the pair of arm portions 30C, 30C are closed to thereby reduce frictional resistances of the arm portions 30C, 30C against the contact surfaces 45a, 45a of the holding portion 45, facilitating a closure of the openable and closable body 3.

In this embodiment, since the pair of arm portions 30C, 30C extend towards the opening direction F1 of the openable and closable body 3 in the direction in which they expand to move away from each other, when the openable and closable body 3 opens, the pair of arm portions 30C, 30C are made easy to be brought into abutment with the inner surfaces 43a or narrow end portions 43b of the introducing portion 43 of the receiving recess portion 40, thereby making it possible to enhance the damper effect. In addition, when the openable and closable body 3 is closed, since the pair of arm portions 30C, 30C are pulled obliquely via the base portion 25C (refer to the arrows in FIGS. 14A and 14B), the frictional resistances of the pair of arm portions 30C, 30C against the contact surfaces 45a, 45a of the holding portion 45 of the receiving recess portion 40 can be reduced easily, facilitating the closure of the openable and closable body 3.

Figure 17A:
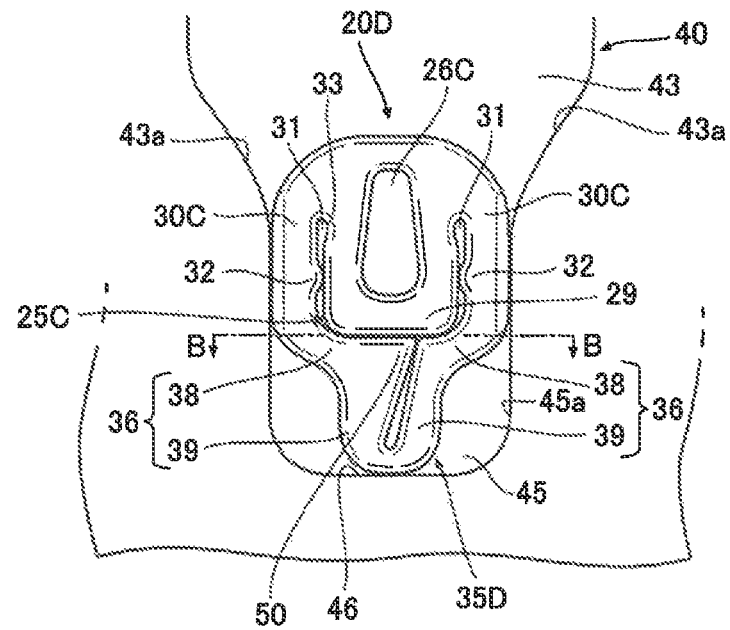
FIG. 17A is an explanatory drawing of a state in which an openable and closable body is opened.
Figure 17B:
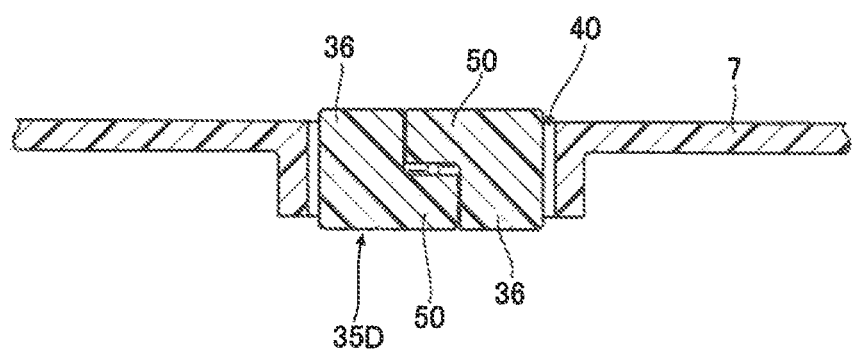
FIG. 17B is a sectional view taken along a line B-B shown in FIG. 17A and viewed in a direction indicated by arrows at ends of the line.
Figure 18:
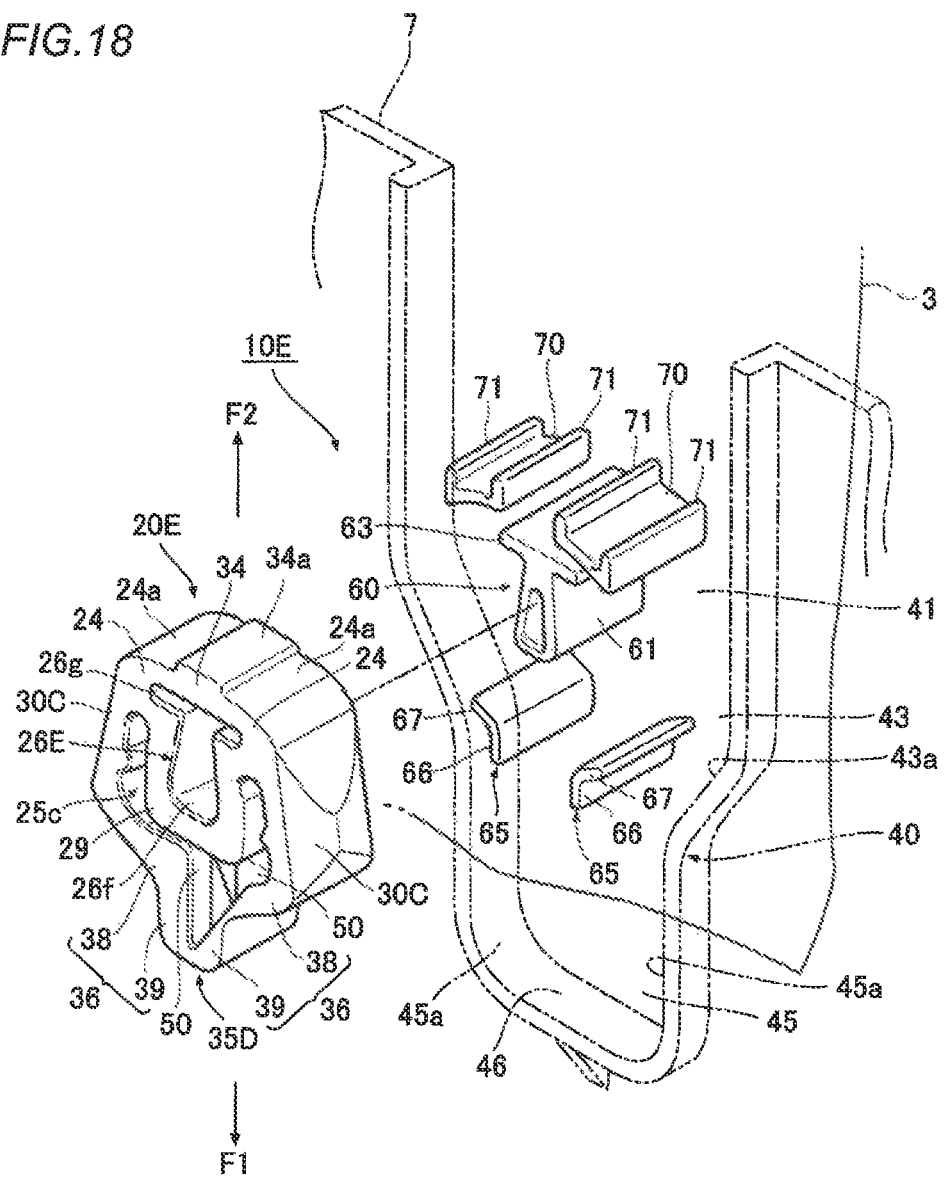
FIG. 18 is a perspective view showing a sixth embodiment of a damper device of the invention.

FIGS. 16 to 17B show a fifth embodiment of a damper device of the invention. It should be noted that like reference numerals will be given to substantially like portions of the fifth embodiment to those of the previous embodiments, and a description of those like portions will be omitted here.

A damper device 10D of this embodiment differs from the damper device 10C of the fourth embodiment in the shape of a bridge portion 35D.

Namely, the damper device 10D of this embodiment includes abnormal deformation suppression ribs 50 for suppressing an abnormal elastic deformation of the bridge portion 35D when an openable and closable body 3 opens, causing an elastic resin member 20D to move to fit into a receiving recess portion 40 (refer to FIG. 16).

In this embodiment, as shown in FIGS. 16 and 17B, the abnormal deformation suppression ribs 50, 50 are provided on inner surface sides of a pair of inclined portions 36, 36 which make up the bridge portion 35D so as to project therefrom in a staggered fashion in a width direction of the inclined portions 36 (in a thickness direction of the elastic resin member 20D). Namely, one abnormal deformation suppression rib 50, which is formed substantially into the shape of a triangular plate, is provided on one end side of an inner surface of one inclined portion 36 in a width direction thereof so as to project therefrom, while the other abnormal deformation suppression rib 50, which is formed substantially into the shape of a triangular plate, is provided on the other end side of an inner surface of the other inclined portion 36 in a width direction thereof so as to project therefrom (refer to FIGS. 16 and 17B).

These abnormal deformation suppression ribs 50, 50 do not interfere with each other as shown in FIG. 17B (refer to FIG. 17B) in such a state that the elastic resin member 20D fits in the receiving recess portion 40 as a result of the openable and closable body 3 opening (refer to FIG. 17A), whereby the abnormal deformation suppression ribs 50 do not prevent the pair of inclined portions 36, 36 of the bridge portion 35D from being deformed elastically.

With the openable and closable body 3 opened as wide as possible (refer to FIG. 17A), as shown in FIG. 17B, the abnormal deformation suppression rib 50 of the one inclined portion 36 is in abutment with an inner surface of the other inclined portion 36, while the abnormal deformation suppression rib 50 on the other inclined portion 36 is in abutment with an inner surface of the one inclined portion 36.

Then, in this embodiment, the following working effect can be obtained when the openable and closable body 3 opens from a state in which the openable and closable body 3 is closed relative to an opening portion 2 of a fixed body 1, causing the elastic resin member 20 to move, whereby a pair of arm portions 30C, 30C are pressed to be deformed by inner surfaces 43a, 43a of an introducing portion 43 and contact surfaces 45a, 45a of a holding portion 45, in association of which the pair of inclined portions 36, 36 of the bridge portion 35 elastically deform.

Namely, forming the abnormal deformation suppression ribs 50 individually on the inclined portions 36 of the bridge portion 35D can enhance the rigidity of the inclined portions 36. Thus, it is possible to suppress such an abnormal deformation that when the inclined portions 36 are elastically deformed as a result of the (Tenable and closable body 3 opening, one of the inclined portions 36 deforms excessively beyond a normal deformation, whereby the pair of inclined portions 36, 36 are both allowed to deform elastically in a well-balanced fashion, thereby making it possible to prevent the damper effect by the bridge portion 35D from being damaged or lost.

The shape of the abnormal deformation suppression ribs and the position where to form them are not limited specifically to those described in this embodiment.

FIGS. 18 to 22B show a sixth embodiment of a damper device of the invention. It should be noted that like reference numerals will be given to substantially like portions of the sixth embodiment to those of the previous embodiments, and a description of those like portions will be omitted here.

In the structure of a damper device 10E of this embodiment, a first restricting projecting portion 65 and a second restricting projecting portion 70 are provided on an openable and closable body 3 to suppress a deformation of an elastic resin member 20E.

In the structure of the elastic resin member 20E of this embodiment, as with the elastic resin member 20C of the fourth embodiment and the elastic resin member 20D of the fifth embodiment, a bridge portion 35D is disposed on an outer side of the other longitudinal end portion of a base portion 25C which is positioned on an end side thereof facing towards an opening direction F1 of an openable and closable body 3. A pair of arm portions 30C, 30C extend from longitudinal end sides on both sides of the base portion 25C. Namely, the pair of arm portions 30C, 30C are coupled to longitudinal end portions on both the sides of the base portion 25C via a coupling portion 24. An outer circumferential surface 24a of the coupling portion 24 constitutes a curved surface. Further, the bridge portion 35D has a pair of inclined portions 36, 36 which extend from distal end portions of the pair of arm portions 30C, 30C in their extending direction towards the opening direction F1 of the openable and closable body 3 in such a manner as to move towards each other, and distal end portions of the pair of inclined portions 36, 36 are coupled to each other.

A fitting portion 26E is formed in the base portion 25C so as to fit on a projecting portion 60 provided on the openable and closable body 3 so as to project therefrom and having substantially a T-shape. This fitting portion 26E is made up of a vertical groove 26f extending along the opening direction F1 of the openable and closable body 3 and a laterally horizontal groove 26g formed at an end portion of the vertical groove 26f which is positioned towards a closing direction F2 of the openable and closable body 3 so as to extend in a direction normal to the closing direction F2 of the openable and closable body 3 and is thus formed substantially into the T-shape. A positioning projecting portion 34a is provided on an outer side of an upper end portion 34 of the base portion 25C which is positioned opposite to an abutment portion 29 at a central portion in a direction normal to the opening direction F1 of the openable and closable body 3 so as to project therefrom. Further, as with the elastic resin member 20D of the fifth embodiment, abnormal deformation suppression ribs 50, 50 are provided on inner surface sides of the pair of inclined portions 36, 36 which make up the bridge portion 35D in a staggered fashion in a width direction of the inclined portions 36 (in a thickness direction of the elastic resin member 20E) so as to project therefrom.

On the other hand, the projecting portion 60 projecting from the openable and closable body 3 (here, projecting from a front side surface of a glove box which is the openable and closable body 3) has a shape which matches that of the fitting portion 26E in the elastic resin member 20E. Namely, this projecting portion 60 is made up of a vertical wall 61 extending along the opening direction F1 of the openable and closable body 3 and configured to fit in the vertical groove 26f of the fitting portion 26E and a laterally horizontal wall 63 provided at an end portion of the vertical wall 61 which is positioned towards the closing direction F2 of the openable and closable body 3 so as to extend at right angles to the closing direction F2 of the openable and closable body 3 and configured to fit in the laterally horizontal groove 26g of the fitting portion 26E and is thus formed substantially into a T-shape.

Then, the first restricting projecting portion 65 is provided on the openable and closable body 3, and the first projecting portion 65 projects from the openable and closable body 3 towards an interior of the receiving recess portion 40 and is disposed on an outer side of the pair of inclined portions 36, 36. When the openable and closable body 3 opens, the first restricting projecting portion 65 enters a holding portion 45 of the receiving recess portion 40 but is prevented from being brought into abutment with a restricting portion 46.

Namely, as shown in FIGS. 18, 19, 21A and 21B, in this embodiment, the first restricting projecting portion 65 is made up of a pair of first restricting projecting portions 65, 65 which project a predetermined height from the openable and closable body 3 towards an interior of the receiving recess portion 40. The pair of first restricting projecting portions 65, 65 are disposed on the outer sides of the pair of inclined portions 36, 36 of the elastic resin member 20E in such a state that the pair of first restricting projecting portions 65, 65 fit in the fitting portion 26E of the elastic resin member 20E.

The pair of first restricting projecting portions 65, 65 are made up of first projecting portions 66, 66 extending parallel to each other along the opening direction F1 of the openable and closable body 3 and second projecting portions 67, 67 extending obliquely outwards from end portions of the first projecting portions 66 which are positioned towards the closing direction F2 side of the openable and closable body 3 so as to expand to move away from each other towards the closing direction F2 of the openable and closable body 3 and are each thus formed substantially into a "collapsed V-shape." The first projecting portions 66 are disposed on outer sides of second leg portions 39 of the inclined portions 36, and the second projecting portions 67 are disposed on outer sides of first leg portions 38 of the inclined portions 36.

Figure 22A:
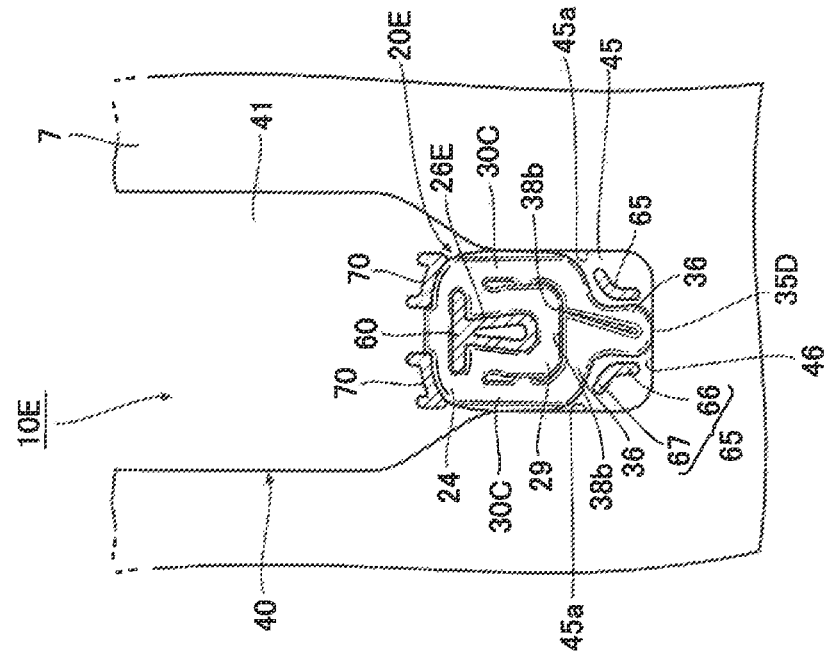
FIGS. 22A and 22B show the damper device of the sixth embodiment of the invention in use.
Figure 22B:
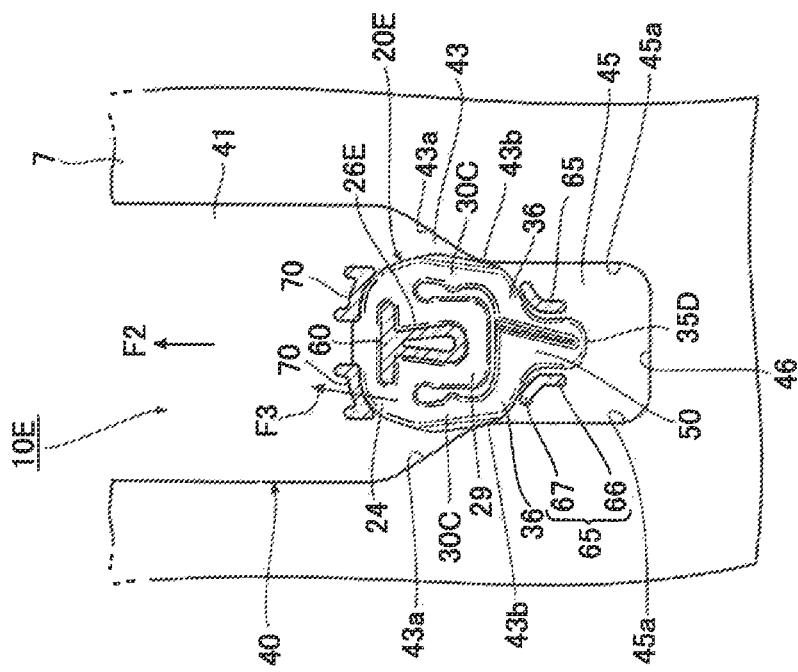

Then, the first restricting projecting portions 65, 65 enter the holding portion 45 of the receiving recess portion 40 (refer to FIGS. 21B and 22A) when the openable and closable body 3 opens from a state where the openable and closable body 3 is closed (refer to FIG. 21A), however, the first restricting projecting portions 65, 65 are prevented from being brought into abutment with the restricting portion 46 positioned at one end portion of the receiving recess portion 40 (refer to FIG. 22B).

Further, in the damper device 10E of this embodiment, the second restricting projecting portion 70 is provided on the openable and closable body 3, and the second restricting projecting portion 70 projects from the openable and closable body 3 towards the interior of the receiving recess portion 40 and is disposed on an outer side of the coupling portion 24 via which the pair of arms 30C, 30C are coupled to the base portion 25C which is positioned towards the closing direction F2 of the openable and closable body 3.

In this embodiment, as shown in FIGS. 18, 19, 21A and 21B, the second restricting projecting portion 70, 70 is made up of a pair of second restricting projecting portions 70, 70 which project a predetermined height from the openable and closable body 3 towards the interior of the receiving recess portion 40. The second restricting projecting portions 70 project into a curved surface which matches in shape the outer circumferential surface 24a of the coupling portion 24 via which the arm portions 30C of the elastic resin member 20E are coupled to the base portion 25C. Additionally, reinforcement ribs 71, 71, which are each formed into an elongated projection, are provided on outer surfaces of both end portions of each second restricting projecting portion 70 in a width direction thereof which is at right angles to a projecting direction in which the second restricting projecting portion 70 projects to thereby reinforce the second restricting projecting portions 70.

The pair of second restricting projecting portions 70, 70 are disposed on an outer side of the coupling portion 24 via which the pair of arm portions 30C, 30C of the elastic resin member 20E are coupled to the base portion 25C which is positioned towards the closing direction F2 of the openable and closable body 3 in such a state that the projecting portion 60 fits in the fitting portion 26E of the elastic resin member 20E. In this embodiment, the pair of second restricting projecting portions 70, 70 are disposed apart a predetermined distance from each other so that the positioning projecting portion 34a can be inserted between the pair of second restricting projecting portions 70, 70.

In addition, the pair of second restricting projecting portions 70, 70 are disposed so as to overlap individually longitudinal end portions of the laterally horizontal wall 63 of the projecting portion 60 (refer to FIG. 19), as a result of which the pair of second restricting projecting portions 70, 70 are disposed so as to overlap individually longitudinal end portions of the laterally horizontal groove 26g of the fitting portion 26E in such a state that the projecting portion 60 fits in the fitting portion 26E of the elastic resin member 20E.

As shown in FIGS. 20A and 20B, a projecting height of each first restricting projecting portion 65 and a projecting height of each second restricting projecting portion 70 into the receiving recess portion 40 are set greater than a projecting height of the projecting portion 60 into the receiving recess portion 40. In this embodiment, the projecting heights of the first restricting projecting portion 65 and the second restricting projecting portion 70 into the receiving recess portion 40 are the same (refer to FIGS. 20A and 20B).

Thus, as has been described heretofore, in the case of this embodiment, the first restricting projecting portions 65 and the second restricting projecting portions 70 are described as being separate from the projecting portion 60. However, for example, the pair of first restricting projecting portions 65, 65 and the projecting portion 60 and the projecting portion 60 and the pair of second restricting projecting portions 70, 70 are coupled to each other by ribs whose projecting height is lower than the projecting heights of the projecting portion 60 and the respective restricting projecting portions 65, 70 so that the first restricting projecting portions 65, the second restricting projecting portions 70 and the projecting portion 60 may be provided integrally with the openable and closable body 3. Additionally, the shapes of the first restricting projecting portions and the second restricting projecting portions are not limited to those described above, and hence, various shapes can be adopted. Further, in this embodiment, the pair of second restricting projecting portions 70, 70 are provided, however, the second restricting projecting portions may be made up of, for example, a single member extending long along a direction of the base portion 25C which is at right angles to the opening direction F1 of the openable and closable body 3. Thus, the number of second restricting projecting portions is not limited specifically.

Next, a working effect will be described which is provided by the damper device 10E of the sixth embodiment configured in the way described heretofore.

Firstly, to mount the elastic resin member 20E on the projecting portion 60, the vertical wall 61 and the laterally horizontal wall 63 of the projecting portion 60 are aligned with the vertical groove 26f and the laterally horizontal groove 26g of the fitting portion 26E of the elastic resin member 20E, and the elastic resin member 20E is then pushed on to the openable and closable body 3. As this occurs, in this embodiment, as has been described above, since the projecting heights of the first restricting projecting portions 65 and the second restricting projecting portions 70 into the receiving recess portion 40 are set greater than the projecting height of the projecting portion 60 into the receiving recess portion 40, as shown in FIG. 20A, the outer sides of the inclined portions 36 of the elastic resin member 20E and the outer side of the coupling portion 24 via which the arm portions 30C are coupled to the base portion 25C are aligned by the first restricting projecting portions 65 and the second restricting projecting portions 70, and thereafter, as shown in FIG. 20B, the projecting portion 60 can be pushed into the fitting portion 26E, thereby making it possible to improve the mounting performance of the elastic resin member 20E on the projecting portion 60 of the openable and closable body 3.

Then, when the openable and closable body 3 is opened towards the opening direction F1 side from a state shown in FIG. 21A in which the openable and closable body 3 is closed relative to the opening portion 2 of the fixed body 1, as shown in FIG. 21B, the pair of arm portions 30C, 30C of the elastic resin member 20E come into abutment with the inner surfaces 43a, 43a of the introducing portion 43 of the receiving recess portion 40 to thereby be bent diametrically towards each other. Then, when the openable and closable body 3 is opened further, as shown in FIG. 22A, the pair of arm portions 30C, 30c fit in the holding portion 45 of the receiving recess portion 40, and the pair of arm portions 30C, 30C are pressed by the contact surfaces 45a, 45a, whereby the pair of inclined portions 36, 36 are bent diametrically towards each other, and the pair of inclined portions 36, 36 move away from the pair of first restricting projecting portions 65, 65.

Thereafter, when the bridge portion 35D, constituting the stopper means, comes into abutment with the restricting portion 46 of the receiving recess portion 40 as shown in FIG. 22B, the abnormal deformation suppression rib 50 on one of the inclined portions 36 comes into abutment with the inner surface of the other inclined portion 36, while the abnormal deformation suppression rib 50 on the other inclined portion 36 comes into abutment with the inner surface of the one inclined portion 36, and the abutment portion 29 of the base portion 25C comes into abutment with the inner surfaces 38b, 38b of the pair of first leg portions 38, 38, whereby the openable and closable body 3 is held in a fully opened state. In this state, the pair of inclined portions 36, 36 are spaced greatly apart from the pair of first restricting projecting portions 65, 65 (refer to FIG. 22B), so that wider clearances than those shown in FIG. 22A are defined between the inclined portions 36 and the first restricting projecting portions 65.

Then, as described above, when the openable and closable body 3 is opened from the closed state, it is desirable that the elastic resin member 20E moves so that an axis C of the projecting portion 60 is aligned with a center line L of the receiving recess portion 40. However, there has been a case in which the elastic resin member 20E moves while deviating from the center line L of the receiving recess portion 40, and one of the arms portions 30C comes into abutment only with one of the inner surfaces 43a of the introducing portion 43 of the receiving recess portion 40 (refer to imaginary lines in FIG. 21A).

Even though what has been described above occurs, in the damper device 10E of this embodiment, since the first restricting projecting portions 65, 65 are disposed on the outer sides of the pair of inclined portions 36, 36 of the elastic resin member 20E so that the first restricting projecting portions 65, 65 enter the holding portion 45 of the receiving recess portion 40 while being prevented from being brought into abutment with the restricting portion 46 when the openable and closable body 3 is opened, the following working effect can be obtained.

Namely, even in the case where when the openable and closable body 3 opens, the pair of arm portions 30C, 30C of the elastic resin member 20E do not abut with the inner surfaces 43a, 43a of the introducing portion 43 of the receiving recess portion 40 uniformly, causing one of the arm portions 30C to come into abutment with one of the inner surfaces 43a of the introducing portion 43 as described above, the elastic resin member 20E can be restricted from deforming excessively by the first restricting projecting portions 65, 65 which are disposed individually on the outer sides of the inclined portions 36, 36 of the elastic resin member 20E, thereby making it possible to enhance the durability of the inclined portions 36 and the arm portions 30C of the elastic resin member 20E, as well as the base portion 25C coupled to the arm portions 30C.

Additionally, in the case where one of the arm portions 30C of the elastic resin member 20E comes into abutment with one of the inner surfaces 43a of the introducing portion 43 of the receiving recess portion 40 (refer to the imaginary lines in FIG. 21A), in the case where the pair of arm portions 30C, 30C come into abutment with the inner surfaces 43a, 43a of the introducing portion 43 (refer to FIG. 21B), and further, in the case where the pair of arm portions 30C, 30C are pressed by the contact surfaces 45a, 45a of the holding portion 45 of the receiving recess portion 40 (refer to FIG. 22A), the coupling portion 24 via which the arm portions 30C are coupled to the base portion 25C attempts to deform to be raised towards the closing direction F2 side of the openable and closable body 3 as indicated by an arrow F3 shown in FIGS. 21A and 21B and 22A. Even in such a case, in the case of the damper device 10E of this embodiment, since the second restricting projecting portions 70 are disposed on the outer side of the coupling portion 24 via which the pair of arm portions 30C, 30C are coupled to the base portion 25C which is positioned towards the closing direction F2 side of the openable and closable body 3, even though the coupling portion 24 via which the pair of arm portions 30C, 30C are coupled to the base portion 25C attempts to deform to be raised towards the closing direction F2 side of the openable and closable body 3 as described above, the arm portions 30C can be restricted from deforming by the second restricting projecting portions 70, thereby making it possible to enhance the durability of the arm portions 30C and the base portion 25C to which the arm portions 30C are coupled.

It should be noted that the invention is not limited to the embodiments that have been described heretofore and hence can modified into various embodiments without departing from the spirit and scope of the invention and that the resulting modifications are also included in the scope of the invention.

BRIEF DESCRIPTION OF REFERENCE NUMERALS

1 Fixed Body
2 Opening Portion
3 Openable and Closable Body
5, 5C Projecting Portion
10, 10A, 10B, 10C, 10D, 10E Damper Device
20, 20A, 20B, 20C, 20D, 20E Elastic Resin Member
24 Coupling Portion
25, 25C Base Portion
25a Outer Circumferential Surface
26, 26C, 26E Fitting Portion
30, 30C Arm Portion
32 Projection
35, 35C, 35D Bridge Portion
36 Inclined Portion
37 Coupling Portion
40, 40a Receiving Recess Portion
43 Introducing Portion
45 Holding Portion
46 Restricting Portion
60 Projecting Portion
65 First Restricting Projecting Portion
70 Second Restricting Projecting Portion.

The invention claimed is:

1. A damper device provided between a fixed body having an opening portion and an openable and closable body mounted on the opening portion of the fixed body so as to be opened and closed and configured to apply a braking force to the openable and closable body when the openable and closable body is opened and closed relative to the opening portion, the damper device having:
    an elastic resin member mounted on a projecting portion provided on the openable and closable body; and a receiving recess portion provided on the fixed body to receive the elastic resin member movably,
    wherein the elastic resin member includes:
        a base portion having a fitting portion in which the projecting portion fits;
        a pair of arm portions extending from an outer circumference of the base portion and capable of deforming elastically;
        a bridge portion coupling together distal end portions of the pair of arm portions directly or via the base portion and configured to deform elastically as the pair of arm portions deforms elastically; and
        a stopper configured to be brought into abutment with the receiving recess portion to restrict the openable and closable body from opening when the openable and closable body opens,
    wherein the base portion, the pair of arm portions, the bridge portion and the stopper are formed integrally, and
    wherein the receiving recess portion includes: an introducing portion configured to come into abutment with the pair of arm portions to bend the pair of arm portions diametrically towards each other; and a restricting portion configured to come into abutment with the stopper to restrict the openable and closable body from opening, the introducing portion and the restricting portion so functioning when the openable and closable body opens to cause the elastic resin member to move.

2. The damper device according to claim 1, wherein the bridge portion includes the stopper.

3. The damper device according to claim 2, wherein the receiving recess portion includes a holding portion configured to hold the pair of arm portions in a diametrically bent state in which the pair of arm portions are bent diametrically towards each other when the stopper comes into abutment with the restricting portion.

4. The damper device according to claim 3,
    wherein a projection is provided on inner surfaces of the pair of arm portions so as to project therefrom, and
    wherein the projection comes into abutment with an outer circumferential surface of the base portion when the stopper comes into abutment with the restricting portion of the receiving recess portion and the pair of arm portions are held in the diametrically bent state by the holding portion.

5. The damper device according to claim 3, wherein the holding portion includes contact surfaces configured to be brought into surface contact with outer surfaces of the pair of arm portions when the stopper comes into abutment with the restricting portion of the receiving recess portion.

6. The damper device according to claim 5, wherein the pair of arm portions are held between the contact surfaces of the holding portion and the outer circumferential surfaces of the base portion when the stopper comes into abutment with the restricting portion of the receiving recess portion.

7. The damper device according to claim 2,
    wherein the receiving recess portion includes a holding portion configured to hold the pair of arm portions in a diametrically bent state in which the pair of arm portions are bent diametrically towards each other when the stopper comes into abutment with the restricting portion, and wherein the pair of arm portions extend from outer circumferential surfaces on both sides of the base portion towards an opening direction of the openable and closable body relative to the opening portion via slits defined between the base portion and the pair of arm portions.

8. The damper device according to claim 7, wherein the pair of arm portions extend in a direction in which the pair of arm portions move away from each other while extending towards the opening direction of the openable and closable body.

9. The damper device according to claim 2,
wherein the bridge portion includes a pair of inclined portions extending from distal end portions of the pair of arm portions in their extending direction towards the opening direction of the openable and closable body so as to move towards each other, the distal end portions being coupled to each other, and
wherein with the openable and closable body opened relative to the opening portion, the pair of inclined portions come into abutment with each other, and the base portion is allowed to come into abutment with the pair of inclined portions.

10. The damper device according to claim 2,
wherein the bridge portion includes a pair of inclined portions extending from distal end portions of the pair of arm portions in their extending direction towards the opening direction of the openable and closable body so as to move towards each other, the distal end portions being coupled to each other,
wherein the receiving recess portion includes a holding portion configured to hold the pair of arm portions in a diametrically bent state in which the pair of arm portions are bent diametrically towards each other when the stopper comes into abutment with the restricting portion, and
wherein a first restricting projecting portion is provided on the openable and closable body, the first restricting projecting portion projecting towards an interior of the receiving recess portion and being disposed on outer sides of the pair of inclined portions, and the first restricting projecting portion enters an interior of the holding portion but is prevented from coming into abutment with the restricting portion when the openable and closable body opens.

11. The damper device according to claim 10, wherein a second restricting projecting portion is provided on the openable and closable body, the second restricting projecting portion projecting towards the interior of the receiving recess portion and being disposed on an outer side of a coupling portion via which the pair of arm portions are coupled to the base portion which is positioned towards a closing direction of the openable and closable body.

12. The damper device according to claim 11, wherein projecting heights of the first restricting projecting portion and the second restricting projecting Portion into the interior of the receiving recess portion are greater than a projecting height of the projecting portion into the interior of the receiving recess portion.

13. The damper device according to claim 1, wherein the base portion includes the stopper.

14. The damper device according to claim 13, wherein when the openable and closable body is closed, the bridge portion of the elastic resin member comes into abutment with an end portion of an inner circumference of the receiving recess portion which is positioned opposite to the restricting portion to deform elastically.

15. The damper device according to claim 13, wherein the base portion and the bridge portion of the elastic resin member are coupled to each other by a coupling portion extending from an inner circumference of the bridge portion towards the base portion.

* * * * *